US012626107B2

(12) United States Patent
Liu et al.

(10) Patent No.:  US 12,626,107 B2
(45) Date of Patent:    May 12, 2026

(54) SYSTEMS AND METHODS FOR TIME SERIES FORECASTING

(71) Applicant: Salesforce, Inc., San Francisco, CA (US)

(72) Inventors: Chenghao Liu, Singapore (SG); Chu Hong Hoi, Singapore (SG); Kun Zhang, Hong Kong (HK)

(73) Assignee: Salesforce, Inc., San Francisco, CA (US)

( * ) Notice: Subject to any disclaimer, the term of this patent is extended or adjusted under 35 U.S.C. 154(b) by 720 days.

(21) Appl. No.: 17/946,363

(22) Filed: Sep. 16, 2022

(65) Prior Publication Data

US 2023/0409901 A1      Dec. 21, 2023

Related U.S. Application Data

(60) Provisional application No. 63/344,495, filed on May 20, 2022.

(51) Int. Cl.
| | |
|---|---|
| *G06N 3/047* | (2023.01) |
| *G06F 18/214* | (2023.01) |
| *G06N 3/045* | (2023.01) |
| *G06N 3/08* | (2023.01) |

(52) U.S. Cl.
CPC ........... *G06N 3/047* (2023.01); *G06F 18/214* (2023.01); *G06N 3/045* (2023.01); *G06N 3/08* (2013.01)

(58) Field of Classification Search
CPC .......... G06N 3/047; G06N 3/045; G06N 3/08; G06F 18/214
See application file for complete search history.

(56) References Cited

U.S. PATENT DOCUMENTS

| | | | |
|---|---|---|---|
| 11,238,729 B1 * | 2/2022 | Guo | G08G 1/0112 |
| 12,198,060 B2 * | 1/2025 | Bai | G06N 3/049 |
| 2020/0104640 A1 * | 4/2020 | Poole | G06N 3/047 |
| 2020/0160176 A1 * | 5/2020 | Mehrasa | G06N 3/047 |
| 2020/0233920 A1 * | 7/2020 | Meeds | G06V 20/698 |

(Continued)

OTHER PUBLICATIONS

Deb, S., et al., "Spatio-temporal models with space-time interaction and their applications to air pollution data," arXiv:1801.00211v1 [stat.ME], Dec. 31, 2017, 32 pages.

(Continued)

*Primary Examiner* — Jeremy L Stanley
(74) *Attorney, Agent, or Firm* — Haynes and Boone, LLP

(57) ABSTRACT

Systems and methods for providing a neural network system for time series forecasting are described. A time series dataset that includes datapoints at a plurality of timestamps in an observed space is received. The neural network system is trained using the time series dataset. The training the neural network includes: generating, using an encoder of the neural network system, one or more estimated latent variables of a latent space for the time series dataset; generating, using an auxiliary predictor of the neural network system, a first latent-space prediction result based on the one or more estimated latent variables; transforming, using a decoder of the neural network system, the first latent-space prediction result to a first observed-space prediction result; and updating parameters of the neural network system based on a loss based on the first observed-space prediction result.

18 Claims, 17 Drawing Sheets

(56) References Cited

U.S. PATENT DOCUMENTS

| | | | | |
|---|---|---|---|---|
| 2020/0372352 A1* | 11/2020 | Deng | G06N 3/045 |
| 2021/0049460 A1* | 2/2021 | Ahn | G06N 3/047 |
| 2021/0073645 A1* | 3/2021 | Kashiwagi | G06N 3/045 |
| 2021/0281491 A1* | 9/2021 | Yelahanka Raghuprasad | H04L 41/5019 |
| 2021/0287531 A1* | 9/2021 | Li | G08G 1/0129 |
| 2021/0298688 A1* | 9/2021 | Banerjee | A61B 5/7257 |
| 2021/0358577 A1* | 11/2021 | Zhang | G16H 50/70 |
| 2021/0394784 A1* | 12/2021 | Blaiotta | G06N 3/0455 |
| 2022/0092415 A1* | 3/2022 | Qiu | G06V 10/751 |
| 2022/0103444 A1* | 3/2022 | Ranjan | H04L 43/106 |
| 2022/0138537 A1* | 5/2022 | Quanz | G06N 3/048 706/21 |
| 2022/0147897 A1* | 5/2022 | Liebman | G06Q 10/06314 |
| 2022/0155079 A1* | 5/2022 | Chidlovskii | G01V 3/08 |
| 2022/0383070 A1* | 12/2022 | Madani | G06N 3/088 |
| 2022/0398697 A1* | 12/2022 | Vahdat | G06N 3/0464 |
| 2022/0400251 A1* | 12/2022 | Fisher | G16H 50/20 |
| 2022/0405583 A1* | 12/2022 | Vahdat | G06N 3/0464 |
| 2023/0154055 A1* | 5/2023 | Besenbruch | H04N 19/13 375/240.03 |
| 2023/0162023 A1* | 5/2023 | Koike Akino | G06N 3/0455 706/25 |
| 2023/0254230 A1* | 8/2023 | Chadha | G06N 3/047 370/229 |
| 2023/0309053 A1* | 9/2023 | Kennouche | G06N 3/0455 |
| 2023/0315079 A1* | 10/2023 | Risbeck | G05B 23/0254 |
| 2023/0394823 A1* | 12/2023 | Weng | B60W 60/00276 |
| 2023/0408726 A1* | 12/2023 | Borges Oliveira | G01W 1/10 |
| 2025/0158637 A1* | 5/2025 | Cooper | G06N 3/084 |

OTHER PUBLICATIONS

Feng, F., et al., "Factored Adaptation for Non-Stationary Reinforcement Learning," arXiv:2203.16582v1 [cs.LG], Mar. 30, 2022, 20 pages.

Liu, H., et al., "Deep Probabilistic Time Series Forecasting using Augmented Recurrent Input for Dynamic Systems," arXiv:2106.05848v2 [cs.LG], Apr. 13, 2022, 30 pages.

Yao, W., et al. "Learning Temporally Causal Latent Processes from General Temporal Data," arXiv:2110.05428v4 [stat.ML], Feb. 8, 2022, 30 pages.

* cited by examiner

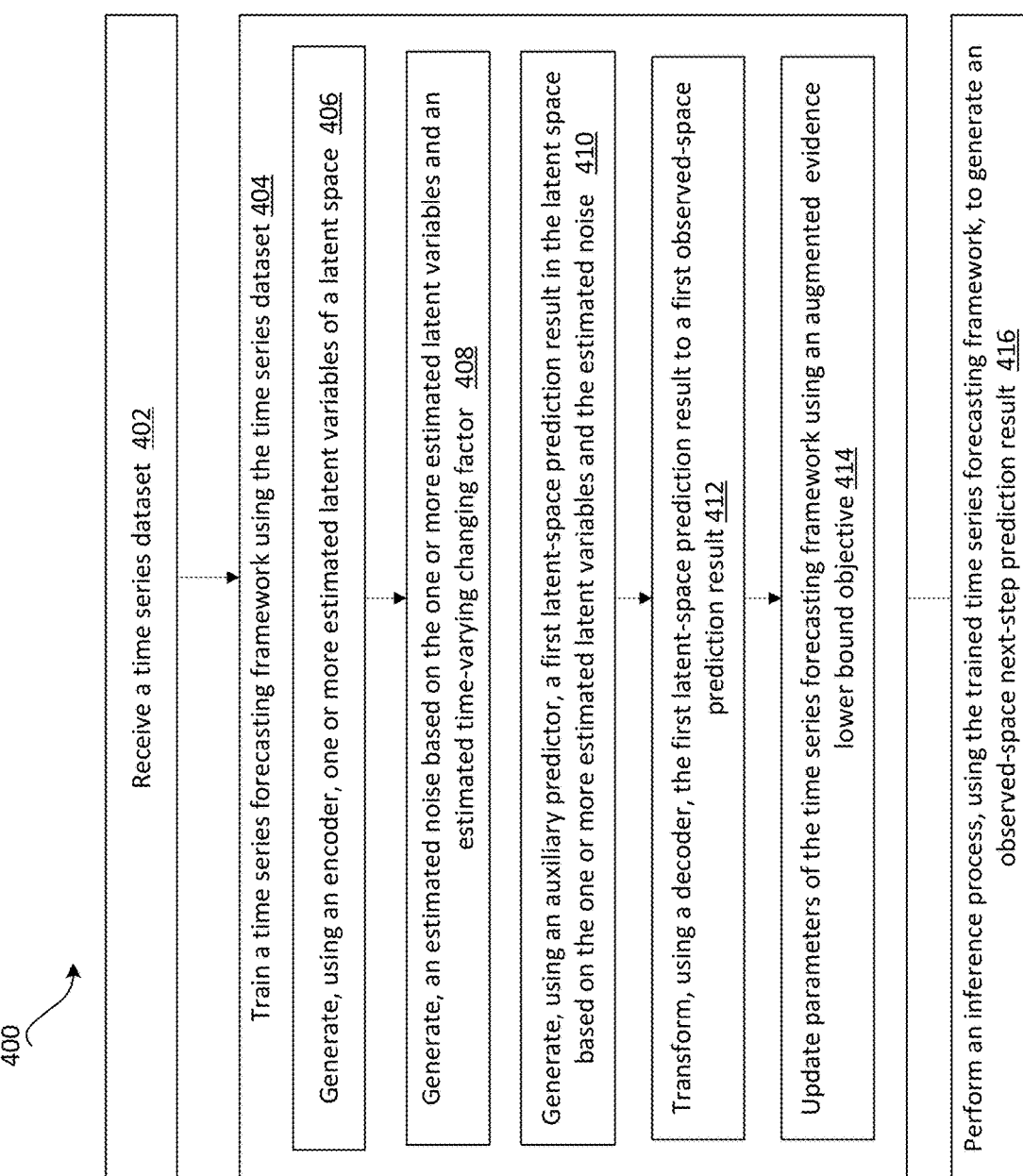

400

Receive a time series dataset 402

Train a time series forecasting framework using the time series dataset 404

Generate, using an encoder, one or more estimated latent variables of a latent space 406

Generate, an estimated noise based on the one or more estimated latent variables and an estimated time-varying changing factor 408

Generate, using an auxiliary predictor, a first latent-space prediction result in the latent space based on the one or more estimated latent variables and the estimated noise 410

Transform, using a decoder, the first latent-space prediction result to a first observed-space prediction result 412

Update parameters of the time series forecasting framework using an augmented evidence lower bound objective 414

Perform an inference process, using the trained time series forecasting framework, to generate an observed-space next-step prediction result 416

FIG. 4

| Configuration | Description | Output |
|---|---|---|
| 1. MLP-Encoder | Encoder Network | |
| Input: $x_{1:T}$ | Observed time series | BS × T × x_dim |
| Dense | 128 neurons, LeakyReLU | BS × T × 128 |
| Dense | 128 neurons, LeakyReLU | BS × T × 128 |
| Dense | 128 neurons, LeakyReLU | BS × T × 128 |
| Dense | Temporal embeddings | BS × T × z_dim |
| 2. MLP-Decoder | Decoder Network | |
| Input: $z_{1:T}$ | Sampled latent variables | BS × T × z_dim |
| Dense | 128 neurons, LeakyReLU | BS × T × 128 |
| Dense | 128 neurons, LeakyReLU | BS × T × 128 |
| Dense | l_dim neurons, reconstructed $\hat{x}_{1:T}$ | BS × T × i_dim |
| 3. Inference Network for $z_{1:T}$ | Inference Network | |
| Input | Temporal embeddings | BS × T × z_dim |
| Bottleneck | Compute mean and variance of posterior | $\mu_{1:T}, \sigma_{1:T}$ |
| Reparameterization | Sampling | $\hat{z}_{1:T}$ |
| 4. Inference Network for $c_{1:T}$ | Inference Network | |
| Input | Temporal embeddings | BS × T × c_dim |
| Bottleneck | Compute mean and variance of posterior | $\mu_{1:T}, \sigma_{1:T}$ |
| Reparameterization | Sampling | $c_{1:T}$ |
| 5. Transition Prior for $z_{1:T}$ | Nonlinear Transition Prior Network | |
| Input | Sampled latent variable sequence $\hat{z}_{1:T}$ and $c_{1:T}$ | BS × T × z_dim |
| Inverse Transition | Compute estimated residuals $\hat{e}_{1:T}$ | BS × T × z_dim |
| JacobianCompute | Compute $\log(|\det(J)|)$ | BS |
| 6. Transition Prior for $c_{1:T}$ | Nonlinear Transition Prior Network | |
| Input | Sampled latent variable sequence $\hat{c}_{1:T}$ | BS × T × c_dim |
| Inverse Transition | Compute estimated residuals $\hat{e}_{1:T}$ | BS × T × c_dim |
| JacobianCompute | Compute $\log(|\det(J)|)$ | BS |
| 7. Auxiliary Predictor | Prediction Network | |
| Input | Sampled latent variable sequence $\hat{z}_{1:T}$ | BS × T × z_dim |
| LSTMInference | Use past $\{z_{t-\tau:t}\}$ to predict $\hat{z}_t$ | BS × T × z_dim |

Architecture details: BS: batch size, T: length of time series, i_dim: input dimension, z_dim: latent dimension, c_dim: time-varying change factor dimension, LeakyReLU: Leaky Rectified Linear Unit.

*FIG. 9*

MCC scores and forecasting performance for the four synthetic datasets. Note: "N/A" indicates the deterministic model LSTM is not applicable to output predictive distribution

| Method | Synthetic 1 | | | Synthetic 3 | | |
|---|---|---|---|---|---|---|
| | MCC | MAE | $R_{0.9}$-loss | MCC | MAE | $R_{0.9}$-loss |
| LSTM | 0.294±0.008 | 0.553±0.014 | N/A | 0.260±0.022 | 0.432±0.028 | N/A |
| KVAE | 0.455±0.009 | 0.525±0.007 | 0.825±0.018 | 0.451±0.052 | 0.332±0.015 | 0.770±0.039 |
| VRNN | 0.557±0.015 | 0.484±0.008 | 0.616±0.007 | 0.578±0.029 | 0.357±0.011 | 0.623±0.033 |
| DeepAR | 0.660±0.010 | 0.107±0.011 | 0.125±0.010 | 0.600±0.021 | 0.087±0.005 | 0.145±0.008 |
| TV-NPSSM | 0.988±0.004 | 0.064±0.008 | 0.078±0.008 | 0.950±0.019 | 0.070±0.012 | 0.133±0.010 |

| Method | Synthetic 2 | | | Synthetic 4 | | |
|---|---|---|---|---|---|---|
| | MCC | MAE | $R_{0.9}$-loss | MCC | MAE | $R_{0.9}$-loss |
| LSTM | 0.262±0.016 | 0.534±0.031 | N/A | 0.223±0.017 | 0.542±0.017 | N/A |
| KVAE | 0.439±0.014 | 0.428±0.013 | 0.978±0.012 | 0.422±0.026 | 0.530±0.009 | 0.742±0.017 |
| VRNN | 0.532±0.039 | 0.442±0.025 | 0.791±0.033 | 0.508±0.060 | 0.495±0.016 | 0.861±0.012 |
| DeepAR | 0.725±0.012 | 0.128±0.009 | 0.251±0.007 | 0.648±0.029 | 0.134±0.015 | 0.163±0.009 |
| TV-NPSSM | 0.994±0.003 | 0.082±0.012 | 0.183±0.009 | 0.992±0.003 | 0.098±0.008 | 0.134±0.010 |

*FIG. 10*

Comparison between TV-NPSSM and NPSSM for MCC scores and forecasting performance

| Method | Synthetic 1 | | | Synthetic 2 | | |
|---|---|---|---|---|---|---|
| | MCC | MAE | $R_{0.9}$-loss | MCC | MAE | $R_{0.9}$-loss |
| NPSSM | 0.9862±0.006 | 0.065±0.007 | 0.077±0.005 | 0.988±0.005 | 0.085±0.020 | 0.194±0.010 |
| TV-NPSSM | 0.9880±0.004 | 0.064±0.008 | 0.078±0.008 | 0.994±0.003 | 0.082±0.012 | 0.183±0.009 |

| Method | Synthetic 3 | | | Synthetic 4 | | |
|---|---|---|---|---|---|---|
| | MCC | MAE | $R_{0.9}$-loss | MCC | MAE | $R_{0.9}$-loss |
| NPSSM | 0.902±0.020 | 0.086±0.004 | 0.150±0.005 | 0.843±0.005 | 0.123±0.012 | 0.159±0.008 |
| TV-NPSSM | 0.950±0.019 | 0.070±0.012 | 0.133±0.010 | 0.992±0.003 | 0.098±0.008 | 0.134±0.012 |

*FIG. 11*

| Model size (Total parameters) of different methods in synthetic experiments. | | | | | | |
|---|---|---|---|---|---|---|
| Model Size | LSTM | KVAE | VRNN | DeepAR | NPSSM | TV-NPSSM |
| | 1k | 72.3k | 56.2k | 46.3k | 78.2k | 117k |

Forecasting performance on two real-world datasets

| COVID-19 | MAE | $R_{0.9}$-loss |
|---|---|---|
| LSTM | $1.352 \pm 0.077$ | N/A |
| KVAE | $3.124 \pm 0.021$ | $0.335 \pm 0.051$ |
| VRNN | $1.254 \pm 0.009$ | $0.056 \pm 0.014$ |
| DeepAR | $1.295 \pm 0.102$ | $0.036 \pm 0.016$ |
| TV-NPSSM | $\mathbf{0.832 \pm 0.061}$ | $\mathbf{0.026 \pm 0.010}$ |

| ECONOMICS | MAE | $R_{0.9}$-loss |
|---|---|---|
| LSTM | $0.379 \pm 0.054$ | N/A |
| KVAE | $0.244 \pm 0.021$ | $8.640 \pm 0.27$ |
| VRNN | $0.512 \pm 0.039$ | $11.19 \pm 0.14$ |
| DeepAR | $0.293 \pm 0.012$ | $6.237 \pm 0.16$ |
| TV-NPSSM | $\mathbf{0.158 \pm 0.020}$ | $\mathbf{3.551 \pm 0.21}$ |

*FIG. 15*

SYSTEMS AND METHODS FOR TIME SERIES FORECASTING

RELATED APPLICATIONS

This application claims priority to U.S. Provisional Patent Application No. 63/344,495 filed May 20, 2022 which is incorporated by reference herein in its entirety.

TECHNICAL FIELD

The embodiments relate generally to time series forecasting, and more specifically to systems and methods for learning latent causal dynamics in time series forecasting.

BACKGROUND

Time series forecasting has been widely used in research and industries such as economic planning, epidemiology study, or energy consumption. State space models, together with deep learning, have been used for time series analysis and prediction. However, these methods usually rely on stringent assumptions regarding the nature of causal relationships that may not hold in practice. For example, if the forms of transition and emission processes with stringent assumptions in these models cannot approximate the actual data generation process, the results could be sub-optimal.

Therefore, there is a need for improved time series forecasting.

BRIEF DESCRIPTION OF THE DRAWINGS

FIG. 4 is an example logic flow diagram illustrating a method of providing time series forecasting based on the non-parametric state space model, according to some embodiments described herein.

FIGS. 9-18 provide example data tables and experimental results illustrating example data performance of the time series forecasting framework based on a non-parametric state space model described in relation to FIGS. 1-7B, according to some embodiments described herein.

In the figures, elements having the same designations have the same or similar functions.

DETAILED DESCRIPTION

As used herein, the term "network" may comprise any hardware or software-based framework that includes any artificial intelligence network or system, neural network, or system and/or any training or learning models implemented thereon or therewith.

As used herein, the term "module" may comprise hardware or software-based framework that performs one or more functions. In some embodiments, the module may be implemented on one or more neural networks.

Time series forecasting using deep learning models is often challenging because the deep learning models may not have a priori knowledge of the time series. For example, in modelling a pandemic transmission and recovery model, the assumptions of protocols such as containment strategies at different periods may not be apparent in the time-series data itself. For example, protocols such as self-quarantine and social distancing mandates, and the like, which were implemented at certain periods during a lookback time window, can often influence the outcome of time series forecasts. However, such knowledge of historical protocols may not be captured by the deep learning model by merely learning the time series data such as the number of new cases, 7-day average, and/or the like within a past time period.

Furthermore, deep learning models are often directly trained to minimize forecasting loss or reconstruction loss. However, deep learning models that are trained to minimize forecasting loss or reconstruction loss may not recover the correct latent processes. The lack of a correct latent process may result in models that capture spurious or over-completed dependencies with noise, which eventually impair the training performance.

In view of the need for a more accurate and computationally efficient time series forecasting mechanism, embodiments described herein provide a state space-model based framework that adopts a non-parametric transition model and a flexible emission model to learn the time-varying property. The state space model may be built upon a hierarchical variable auto encoder to estimate the a priori knowledge of the time series which may then be used in forecasting.

Figure 1:
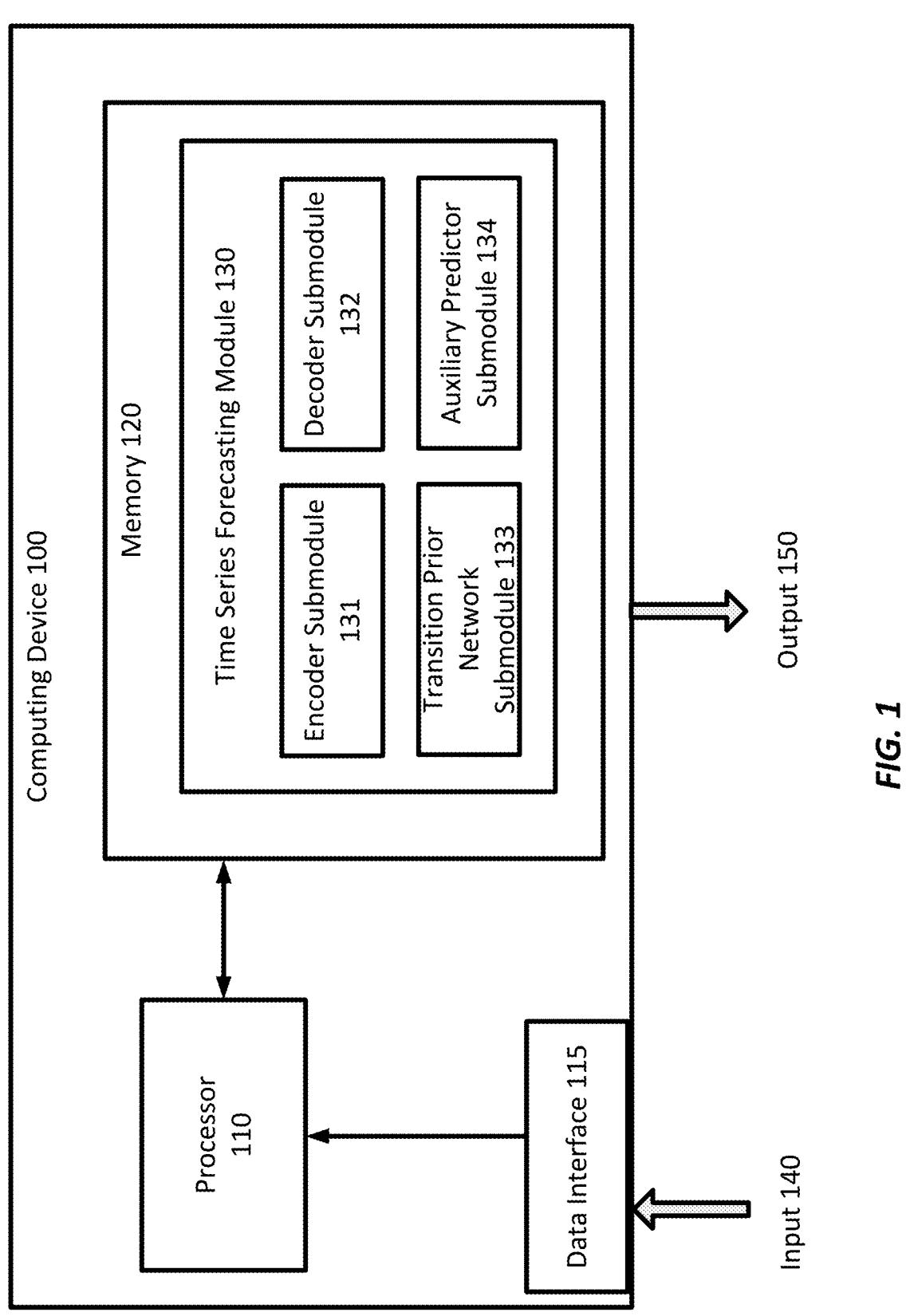
FIG. 1 is a simplified block diagram of a computing device for implementing the time series forecasting framework based on a non-parametric state space model described in embodiments herein.
Figure 5:
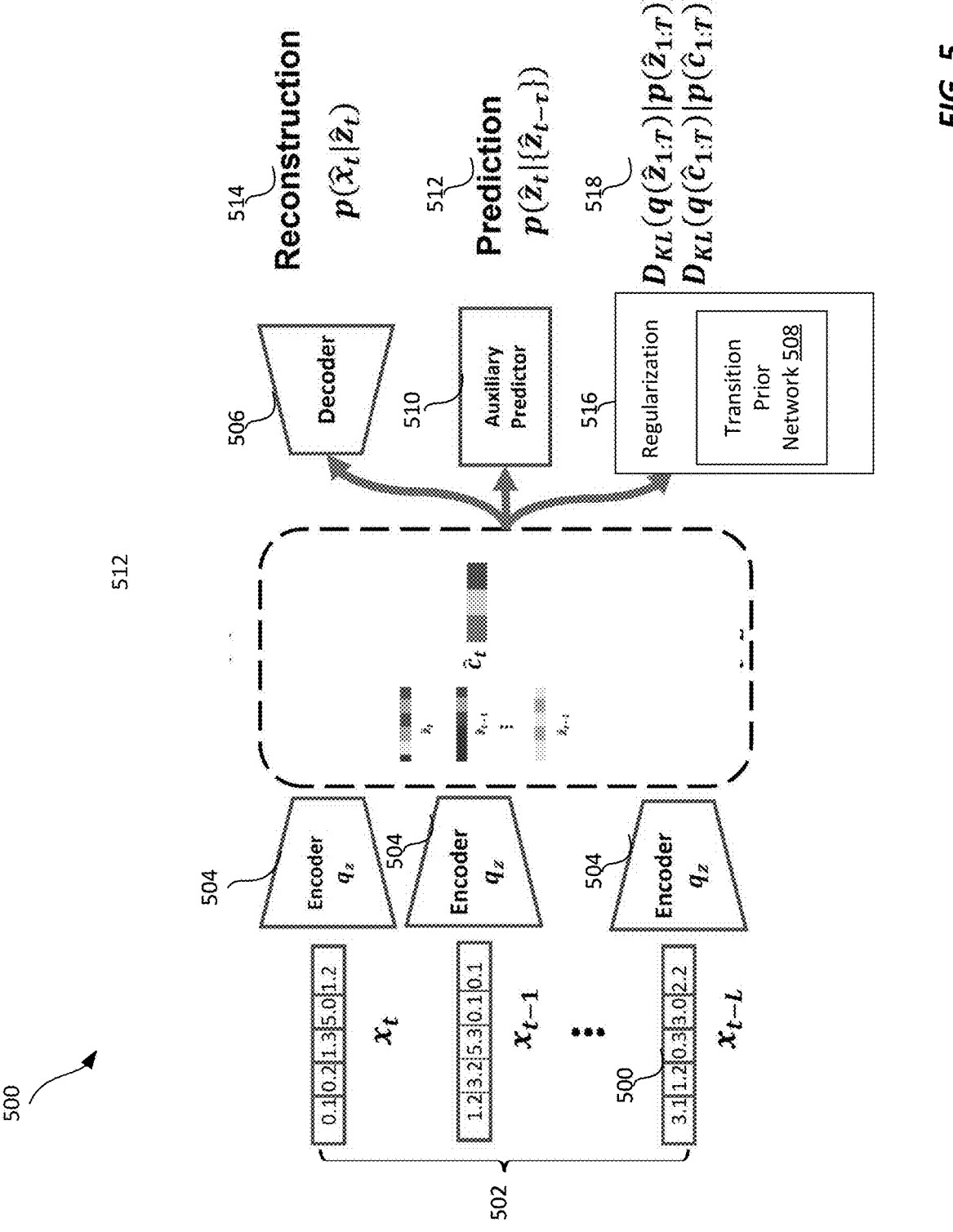
FIG. 5 is an example block diagram illustrating an example architecture for a time series forecasting framework based on the non-parametric state space model in model training, according to some embodiments described herein.

FIG. 1 is a simplified diagram of a computing device 100 for implementing a time series forecasting framework of FIG. 5, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory

120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for the time series forecasting module 130 that may be used to implement and/or emulate the systems and models, and/or to implement any of the methods described further herein. A time series forecasting module 130 may receive input 140 that includes an input such as time series data, and/or the like via the data interface 115. The time series forecasting module 130 may generate an output 150 such as a prediction.

In some embodiments, the time series forecasting module 130 includes the encoder submodule 131, the decoder submodule 132, the transition prior network submodule 133, and the auxiliary predictor submodule 134. In one embodiment, the time series forecasting module 130 and its submodules 131-134 may be implemented by hardware, software and/or a combination thereof.

Some examples of computing devices, such as computing device 100 may include non-transitory, tangible, machine readable media that include executable code that when run by one or more processors (e.g., processor 110) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
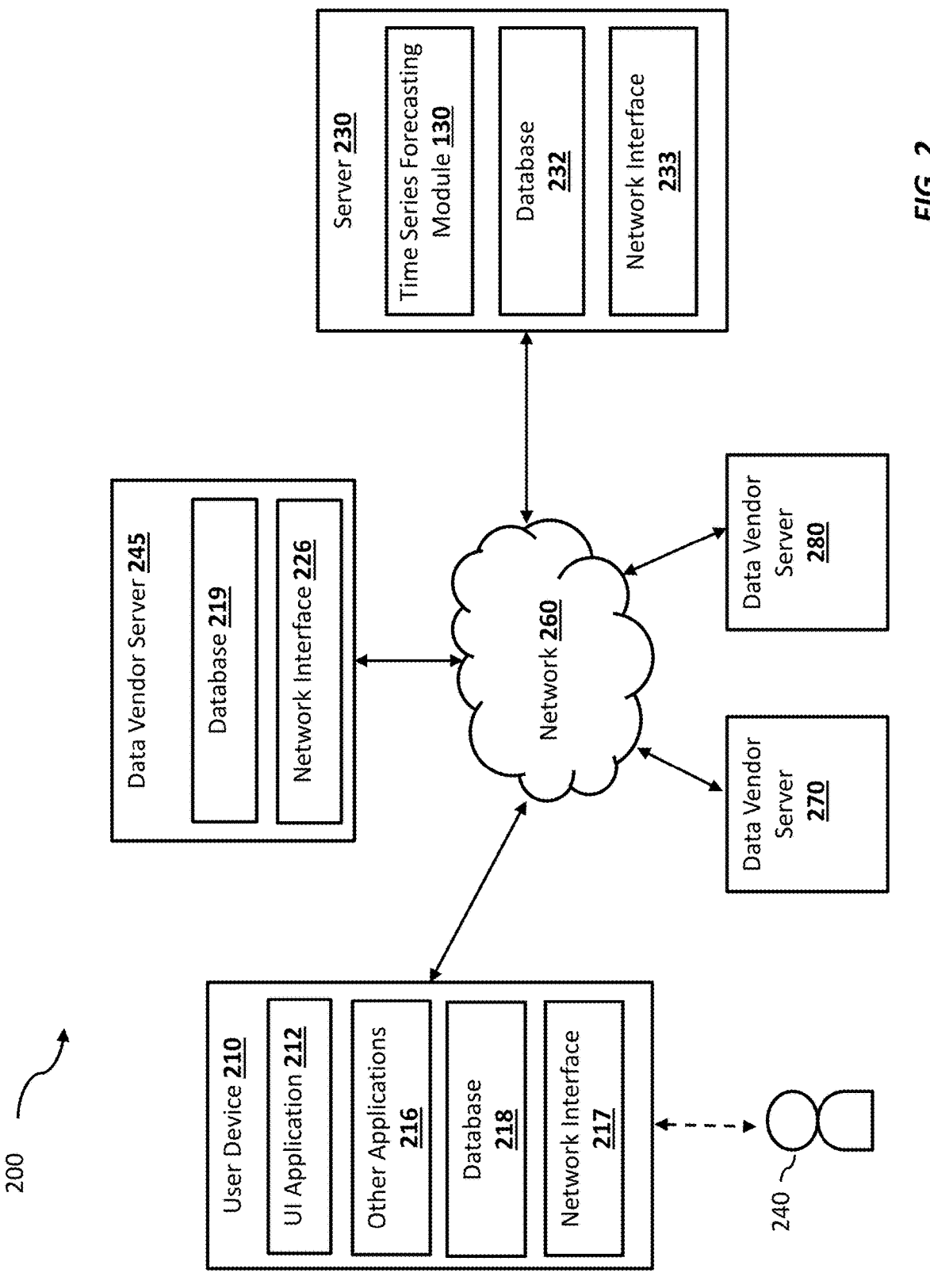
FIG. 2 is a simplified block diagram of a networked system suitable for implementing the time series forecasting framework based on a non-parametric state space model described in embodiments herein.

FIG. 2 is a simplified block diagram of a networked system suitable for implementing the time series forecasting framework described in FIG. 5 and other embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX®

OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating a prediction result from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a prediction result message from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the prediction result.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 219 adapted to communicate with data vendor server 245 and/or the server 230. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases 203a-n (or collectively referred to as 203) to provide training datasets including time series dataset to the server 230. The database 203 may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 203, via the network interface 226, to the server 230.

The server 230 may be housed with the time series forecasting module 130 and its submodules described in FIG. 1. In some implementations, module 130 may receive data from database 219 at the data vendor server 245 via the network 260 to generate a fixed patch of code. The generated fixed patch of code may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of the time series forecasting module 130. In one implementation, the database 232 may store previously generated fixed patch of code and the corresponding input feature vectors.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Referring to FIGS. 3-18, detailed description of various embodiments of the time series forecasting framework based on a non-parametric state space model are described. As various notations are used throughout, and the table below provides a summary of the notations used herein.

| Index | |
|---|---|
| t | Time index |
| i, j, k | Variable element (channel) index |
| $\tau$ | Time lag index |
| L | Maximum time lag for latent variable |
| $L_c$ | Maximum time lag for time-varying change factors |
| Variable | |
| $x_t$ | Observation data |
| $x_i$ | Reconstructed observation |
| $z_t$ | latent variable |
| $\hat{z}_t$ | estimated latent variable |
| $c_t$ | time-varying change variable |
| $\hat{c}_t$ | estimated time-varying change variable |
| $Pa(z_{it})$, $\{z_{t-\tau}\}$ | Set of direct cause nodes/parents of node $z_{it}$ |
| $\eta_t$ | measurement noise term |
| $\varepsilon_{it}$ | Process noise term |
| $\zeta_t$ | noise term for time-varying change factor |
| Function and Hyperparameter | |
| p | Distribution function (e.g., $p_{\varepsilon_{it}}$ is the distribution of $\varepsilon_{it}$.) |
| g | Arbitrary nonlinear and invertible mixing function |
| $f_i$ | Nonlinear transition function for $z_{it}$ |
| $f_c$ | Nonlinear transition function for $c_t$ |
| h | Post nonlinear distortion function |
| $r_i$ | Learned inverse transition function for residual $\hat{\varepsilon}_i$ |
| $u_i$ | Learned inverse change transition function for residual $\zeta_i$ |
| $\beta$, $\gamma$, $\sigma$ | Weights in the augmented ELBO objective |
| n | Latent size |
| $\pi$ | Permutation operation |
| T | Component-wise invertible nonlinearities |

Time series forecasting plays a crucial role in economic planning, epidemiology study, and energy consumption. In various applications, one critical step is to infer the causal structure of the underlying stochastic dynamical system from the time series of measurements. State space models provide a unified methodology to learn and analyze time-lagged causal relations. Formally, given the observed data $x_t$, the dynamical system with latent process $z_t$ may be described as:

$$\underbrace{z_t = f_i(z_{t-1}) + \epsilon_t}_{Transition}, \underbrace{x_t = g(z_t) + \eta_t}_{Emission}, \tag{1}$$

where $\eta_t$ and $\epsilon_t$ denote the i.i.d. Gaussian measurement/ process noises. $f(\bullet)$ and $g(\bullet)$ denote the nonlinear transition model and the nonlinear emission model, respectively. The transition model $f(\bullet)$ aims to capture the latent dynamics underlying the observed data, while the emission model $g(\bullet)$ is designed for learning the mapping from the latent variables to the observed data. More expressive, scalable deep learning models may be leveraged for modeling complex transition and emission models effectively. Since the latent processes are typically unobserved, various works have focused on latent variable estimation via designing more efficient optimization methods. However, these works do not ensure that the models learn the correct underlying latent processes. First, they rely on stringent assumptions regarding the nature of causal relationships, which may not hold in practice. In particular, the additive noises in both transition and emission processes are not able to capture nonlinear distortions in the observed/latent values of the variables, which might be necessarily true in real-world applications, like sensor distortion, and motion capture.

Existing works often do not provide theoretical guarantees for identifiability. Usually in the implementations, state space models are directly trained with the forecasting loss or reconstruction loss. However, these objectives could not guarantee that they can recover the correct latent processes. These issues would be severe when using neural networks to learn transition and emission models. Because the parameter space has been significantly increased, the model tends to capture spurious and over-completed dependencies with noise. Then, the training processes are difficult and thus may result in sub-optimal performance. This situation would deteriorate when data are not abundant or the data generation process changes across the time period. Furthermore, the transition model $f(\bullet)$ is usually assumed to be constant across the measured time period. It implicitly assumes that the underlying dynamical system is in a stationary environment, which may not hold in real-life problems. For example, the unemployment rate tends would rise much faster at the start of a recession than it drops at the beginning of a recovery. In the analysis of the COVID-19 outbreak, the transmission and removal processes may vary over time, governed by various virus containment strategies at different time periods, such as self-quarantine and social distancing mandates. If the forms of transition and emission processes with stringent assumptions cannot approximate the actual data generation process, the results will be sub-optimal.

As described herein, an improved framework using neural network model that is general enough when precise prior knowledge is unavailable is described. A general formulation of state space models, called Non-Parametric State Space Models (NPSSM), is described. NPSSM includes a completely non-parametric transition model and a flexible emission model. While the Non-Parametric State Space Model (NPSSM) is remarkably flexible, the latent processes are generally identifiable. In addition, a Time-Varying Non-Parametric State Space Model (TV-NPSSM) based on the NPSSM is described to capture the potential time-varying change property of the latent processes.

Furthermore, a time series forecasting framework may be provided by using a hierarchical VAE framework with the NPSSM. The time series forecasting framework may incorporate the stringent conditions for identifiability analysis to estimate the procedure and make it applicable for forecasting tasks. The time series forecasting framework may recover time-lagged latent variables and their causal relations from observed sequential data.

Accordingly, systems and methods described herein may be viewed to use a method for causal representation learning for time series data. Forecasting may benefit from this general and identifiable model, since the underlying latent process may be identified. Some of the features are listed as follows, which will be described in detail with reference to FIGS. 3-18 below.

First, general formulation of state space models, namely, NPSSM, are described. Further, an extension, namely, Time-Varying Non-Parametric State Space Model (TV-NPSSM), is described, which allows nonstationarity of the latent process over time. These models provide a flexible form for transition and emission model that is expected to be widely applicable.

Second, the identifiability of the time-lagged latent variables and their influencing strengths for NPSSM under relatively mild conditions are established.

Third, by incorporating the independent noise conditions for the identifiable analysis, a new hierarchical VAE framework for model estimation and its use for forecasting tasks are described.

Fourth, estimation of the models described herein may be viewed as a way to learn the underlying temporal causal processes, which further facilitates forecasting of the time series.

Figure 3:
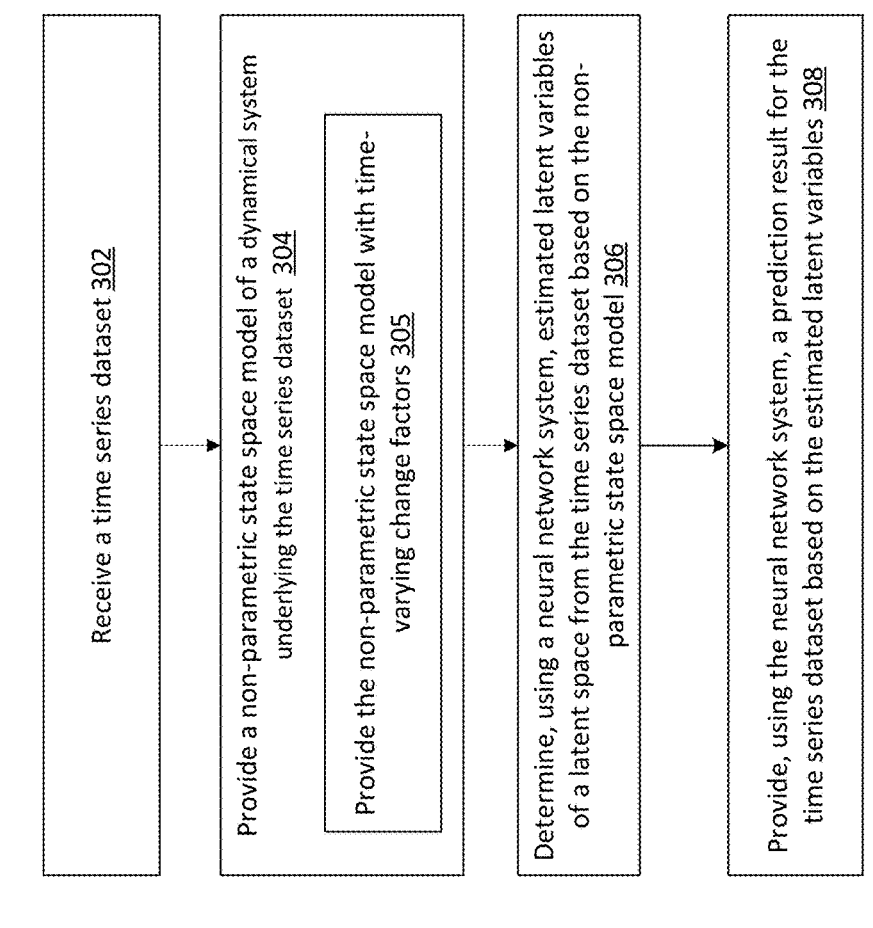
FIG. 3 is an example logic flow diagram illustrating a method of providing time series forecasting based on a non-parametric state space model for a dynamical system underlying the time series data, according to some embodiments described herein.

Referring to FIG. 3, an example method 300 of providing time series forecasting based on a non-parametric state space model is illustrated. One or more of the processes described in FIG. 3 may be implemented, at least in part, in the form of executable code stored on non-transitory, tangible, machine-readable media that when run by one or more processors may cause the one or more processors to perform one or more of the processes 302-308. In some embodiments, method 300 may correspond to the method used by the module 130 in FIG. 1.

At step 302, a time series dataset is received (e.g., via data interface 215). The time series dataset comprises datapoints at a plurality of timestamps in the timeseries.

At step 304, a non-parametric state space model (NPSSM) for a dynamical system underlying the time series dataset is provided. As described in detail below, the non-parametric state space model includes a nonparametric latent transition model and a flexible emission model.

To make state space models in Eq. (1) flexible, functional causal model is used to characterize transition process. Each latent factor $z_{it}$ is represented with the non-parametric form $z_{it}=f_i(\{z_{j,t-\tau}|z_{j,t-\tau}\in Pa(z_{it})\}, \epsilon_{it})$, where i, j denotes variable element index, $Pa(z_{it})$ (parents) denotes the set of time-lagged variables that directly determine the latent factor $z_{it}$, and $\tau$ denotes the time lag index. In this way, noise $\epsilon_{it}$ together with parents of $z_{it}$ generate $z_{it}$ via unknown non-parametric function $f(\bullet)$. Formally, NPSSM can be formulated as $$z_{it} = f_i(\{z_{j,t-\tau} \mid z_{j,t-\tau} \in \mathrm{Pa}(z_{it})\}, \epsilon_{it}), \qquad (2)$$
$$\underbrace{\phantom{z_{it} = f_i(\{z_{j,t-\tau} \mid z_{j,t-\tau} \in \mathrm{Pa}(z_{it})\}, \epsilon_{it})}}_{\textit{Nonparametric latent transition}}$$

$$x_t = g(z_t, \eta_t) = g1(g2(z_t) + \eta_t),$$
$$\underbrace{\phantom{x_t = g(z_t, \eta_t) = g1(g2(z_t) + \eta_t)}}_{\textit{Post nonlinear emissionion}}$$

where $\epsilon_{it}$ are mutually independent (i.e. spatially and temporally independent) random noises sampled from noise distribution $p(\epsilon_{it})$. $g2(\bullet)$ is the nonlinear mixing function that takes latent factors as input. $g1(\bullet)$ denotes invertible post-nonlinear distortion on variable $x_t$ and $\eta_t$ are independent noises. As such, a general form of the state space model is provided.

In NPSSM, the transition function of the latent processes is completely non-parametric: the effect $z_{it}$ is just a smooth function (referring to the condition 3 of Theorem 1 below, which is the core condition to guarantee the identifiability of NPSSM) of its parents and noise, and it may contain linear models, nonlinear models with additive noise, and even multiplicative noise model as special cases. The Independent Noise condition and Conditional Independent condition (see, e.g., J. Pearl., Causality. Cambridge university press, 2009) are widely satisfied in time series data. Furthermore, in the emission function, the post-nonlinear transformation g1(•) may model sensor or measurement distortion that usually happens when the underlying processes are measured with instruments.

Identifiability of NPSSM. Next, the identifiability of NPSSM in the function space is defined. Since the conditional independence relations fully capture time-delayed causal relations in the time-delayed causally sufficient system, NPSSMs are identifiable if the latent variables are identifiable up to permutation and component-wise invertible transformations.

Definition 1 (Identifiability of NPSSM). For a ground truth (f, g, p(ε)) and a learned (f̂, ĝ, p̂(ε)) models as defined in Eq. (2), if the joint distribution for observed variables $p_{f,g,p(\epsilon)}(x_t)$ and $p_{\hat{f},\hat{g},\hat{p}(\epsilon)}(x_t)$ are matched almost everywhere, then non-parametric state space models are identifiable if observational equivalence can always lead to identifiability of the latent variables up to permutation $\pi$ and component-wise invertible transformation T:

$$p_{\hat{g},\hat{f},\hat{p}_\epsilon}(x_t) = p_{g,f,p_\epsilon}(x_t) \Rightarrow g^{-1} = \hat{g}^{-1} \circ T \circ \pi \qquad (3)$$

where $g^{-1} = \hat{g}^{-1}$ are invertible functions that maps $x_t$ to and $\hat{z}_t$ respectively.

Next the identifiability result of the proposed model is discussed. Without loss of generality, assume the maximum time lag L=1 in the analysis. Note that it is trivial to extend the analysis for a long lag L>1. NPSSM is remarkably flexible, and further it is identifiable up to relative minimum indeterminacies. Each latent process can be recovered up to its nonlinear, invertible transformations. In many real time series applications, these indeterminacies may be inconsequential.

Theorem 1. Suppose that we observe data sampled from a generative model (as defined according to P. Becker, H. Pandya, G. Gebhardt, C. Zhao, C. J. Taylor, and G. Neumann, Recurrent Kalman networks: Factorized inference in high-dimensional deep feature spaces, International Conference on Machine Learning, pages 544-552, PMLR, 2019) with parameters (f̂, ĝ, p̂(ε)). Assume the following holds:

1. The set $\{x_t \in \chi | \varphi_{\eta_t}(x_t) = 0\}$ has measure zero, where $\varphi_{\eta_t}$ is the characteristic function of the density $p(\eta_t) = p_g(x_t | z_t)$. The post nonlinear functions g1, ĝ1 are invertible. The mixing functions g2, ĝ2 are injective and differentiable almost everywhere.

2. The noise terms $\epsilon_{it}$ are mutually independent.

3. Let $\eta_{kt} \triangleq \log p(z_{kt}|z_{t-1})$, $\eta_{kt}$ is twice differentiable in $z_{kt}$ and is differentiable in $z_{l,t-1}$, l=1, 2, . . . , n. For each value of $z_t$, $v_{1t}$, $\mathring{v}_{1t}$, $v_{2t}$, $\mathring{v}_{2t}$, . . . , $v_{nt}$, $\mathring{v}_{nt}$ as 2n vector functions in $z_{1,t-1}$, $z_{2,t-1}$, . . . , $z_{n,t-1}$, are linearly independent, with $v_{kt}$ and $\mathring{v}_{kt}$ defined below:

$$v_{kt} \triangleq \left( \frac{\partial^2 \eta_{kt}}{\partial z_{kt} \partial z_{1,t-1}}, \frac{\partial^2 \eta_{kt}}{\partial z_{kt} \partial z_{2,t-1}}, \dots, \frac{\partial^2 \eta_{kt}}{\partial z_{kt} \partial z_{n,t-1}} \right)^T,$$

-continued $$\mathring{v}_{kt} \triangleq \left( \frac{\partial^3 \eta_{kt}}{\partial z_{kt}^2 \partial z_{1,t-1}}, \frac{\partial^3 \eta_{kt}}{\partial z_{kt}^2 \partial z_{2,t-1}}, \dots, \frac{\partial^3 \eta_{kt}}{\partial z_{kt}^2 \partial z_{n,t-1}} \right)^T,$$

then $z_t$ must be an invertible, component-wise transformation of a permuted version of $\hat{z}_t$.

Compared to the form of conventional state space models in Eq. (1), NPSSM is remarkably flexible, and are applicable to many real problems. Further, Theorem 1 indicates that NPSSM is still generally identifiable. With NPSSM, the underlying causal latent processes may be determined from the observed data. The differentiability and linear independence in condition 3 is the core condition to assure the identifiability of latent factors $z_t$ from observed $x_t$. It indicates that time-lagged variables must have a sufficiently complex and diverse effect on the transition distributions in terms of the second- and third-order partial derivatives. From this condition we can find that the linear Gaussian SSM is unidentifiable, since the second- and third-order partial derivatives would be constant, which violates the linear independence assumption.

Below a proof of the identifiability theory for NPSSM is provided. Lemma 1, which presents the identifiability of latent variables in fixed latent dynamics, is first introduced. This result will be used in the proof of Theorem 1.

Lemma 1. The fixed latent causal dynamics takes on the following form:

$$x_t = g(z_t) z_{it} = f_i(\{z_{j,t-1} | z_{j,t-1} \in Pa(z_{it})\}, \epsilon_{it}). \qquad (4)$$

Let $\eta_{kt} \triangleq \log p(z_{kt}|z_{t-1})$, $\eta_k(t)$ is twice differentiable in $z_{kt}$ and is differentiable in $z_{l,t-1}$, l=1, 2, . . . , n. Suppose there exists invertible function ĝ that maps $x_t$ to $z_t$, i.e., $z_t = \hat{g}(x_t)$, such that the components of $\hat{z}_t$ are mutually independent conditional on $\hat{z}_{t-1}$. Let $$v_{kt} \triangleq \left( \frac{\partial^2 \eta_{kt}}{\partial z_{kt} \partial z_{1,t-1}}, \frac{\partial^2 \eta_{kt}}{\partial z_{kt} \partial z_{2,t-1}}, \dots, \frac{\partial^2 \eta_{kt}}{\partial z_{kt} \partial z_{n,t-1}} \right)^T,$$

$$\mathring{v}_{kt} \triangleq \left( \frac{\partial^3 \eta_{kt}}{\partial z_{kt}^2 \partial z_{1,t-1}}, \frac{\partial^3 \eta_{kt}}{\partial z_{kt}^2 \partial z_{2,t-1}}, \dots, \frac{\partial^3 \eta_{kt}}{\partial z_{kt}^2 \partial z_{n,t-1}} \right)^T.$$

If for each value $z_t$ $v_{1,t}$, $\dot{v}_{1,t}$, $v_{2,t}$, $\dot{v}_{2,t}$, . . . , $v_{n,t}$, $\dot{v}_{n,t}$ as 2n vector functions in $z_{1,t-1}$, $z_{2,t-1}$, . . . , $z_{n,t-1}$ are linearly independent, then z t must be an invertible, component-wise transformation of a permuted version of $\hat{z}_t$.

Second, the additive noise model is considered, in which $g_1$ is the identity mapping. To identify the noise-free distribution $g(z_t)$ from noisy data with assumption 1, convolution theorem is used to decouple measurement error. Since the volume of a matrix volA is defined as the product of the singular values of A. It is obtained that volA=|detA| when A is invertible. Use volA in the change of variables formula to replace the absolute determinant of the Jacobian, and suppose the joint distribution for observed variables $p_{f,g,p(\epsilon)}$ $(x_t | z_{t-1})$ and $p_{\hat{f},\hat{g},\hat{p}(\epsilon)}$ $(x_t | \hat{z}_{t-1})$ are matched almost everywhere. Then:

$$\int_z p_{f,p(\epsilon)}(z_t | z_{t-1}) p_g(x_t | z_t) dz_t = \int_z p_{\hat{f},\hat{p}(\epsilon)}(z_t | \hat{z}_{t-1}) p_{\hat{g}}(x_t | z_t) dz_t, \qquad (5)$$

$$\int_z p_{f,p(\epsilon)}(z_t | z_{t-1}) p_{\eta_t}(x_t | g(z_t)) dz_t = \int_z p_{\hat{f},\hat{p}(\epsilon)}(p_{\hat{f},\hat{p}(\epsilon)}(z_t | z_{t-1}) \\ p_{\eta_t}(x_t - \hat{g}(z_t)) dz_t \qquad (6)$$

According to the Jacobian matrix of the mapping from $\bar{x}_t = g(z_t)$ and $\bar{x}_t = \hat{g}(z_t)$, we have $$\int_x p_{f,p(\epsilon)}(g^{-1}(\bar{x}_t) | z_{t-1}) vol\, J_{g^{-1}}(\bar{x}_t) p_{\eta_t}(x_t - \bar{x}_t) d \\ \bar{x}_t = \int_x p_{\hat{f},\hat{p}(\epsilon)}(\hat{g}^{-1}(\bar{x}_t) | \hat{z}_{t-1}) vol\, J_{\hat{g}^{-1}}(\bar{x}_t) p_{\eta_t}(x_t - \bar{x}_t) d\bar{x}_t \qquad (7)$$

Assume $\overline{p}_{f,p(\epsilon),g,z_{t-1}}(x_t = p^{f,p(\epsilon)} = p_{f,p(\epsilon)}(g^{-1} \quad (x_t)|z_{t-1})$vol $J_{g^{-1}} \Pi_x(x_t)$, and then we have $$\int_x \overline{p}_{f,p(\epsilon),g,z_{t-1}}(\overline{x}_t)p_{\eta_t}(x_t - \overline{x}_t)d\overline{x}_t = \int_x \overline{p}_{\hat{f},\hat{p}(\epsilon),\hat{g},\hat{z}_{t-1}}(\overline{x}t)p_{\eta_t}(x_t - \overline{x}_t))d\overline{x}_t \tag{8}$$

According to the convolution theorem that the convolution in one domain (e.g., time domain) equals point-wise multiplication in the other domain (e.g., frequency domain), the following is obtained, $$(\overline{p}_{f,p(\epsilon),g,z_{t-1}} * p_{\eta_t})(x_t) = (\overline{p}_{\hat{f},\hat{p}(\epsilon),\hat{g},\hat{z}_{t-1}} * p_{\eta_t})(x_t), \tag{9}$$

$$F[\overline{p}_{f,p(\epsilon),g,z_{t-1}}](\omega)\varphi_{\eta_t} = (\omega) = F[\overline{p}_{\hat{f},\hat{p}(\epsilon),\hat{g},\hat{z}_{t-1}}](\omega)\varphi_{\eta_t}(\omega) \tag{10}$$

where * denotes the convolution operator and $F[\cdot]$ denotes the Fourier transform. We can find $\varphi_{\eta_t} = F[p_{\eta_t}]$ by the definition of characteristic function in Assumption 1. Then, we can remove $\varphi_{\eta_t}(\omega)$ term from both sides as it is non-zero almost everywhere. We have $$F[\overline{p}_{f,p(\epsilon),g,z_{t-1}}](\omega) = F[\overline{p}_{\hat{f},\hat{p}(\epsilon),\hat{g},\hat{z}_{t-1}}](\omega), \tag{11}$$

$$\overline{p}_{f,p(\epsilon),g,z_{t-1}}(x_t) = \overline{p}_{\hat{f},\hat{p}(\epsilon),\hat{g},\hat{z}_{t-1}}(x_t) \tag{12}$$

Thus, we can conclude that if the distributions are the same with additive noise, the noise-free distributions are still the same. Combined with the results from Lemma 1, the latent variables are identifiable up to permutation and component-wise invertible transformation.

Further, the effect of post non-linear function $g_1(\cdot)$ is considered. Denote $\hat{x}_t = g_2(z_t) + \eta_t$, then the learned post nonlinear function $x_t = \hat{g}_1(\hat{x}_t)$ can be written as $x_t = (g_1 \circ (g_1)^{-1} \circ \hat{g}_1)$ $(\ddot{x}_t)$. Assume that $\hat{g}_1 = g_1 \circ ((g_1)^{-1} \circ g_1) = g_1 \circ g_3$, in which $g_3$ represents the indeterminancy on the space of $\tilde{x}_t$. Following the proof of Theorem 1, we have that $g_3$ can only be a bijection if both $g_2$, $\hat{g}_1$ are injective functions. Thus, it may be treated as adding a component-wise invertible nonlinear function $g_3^{-1}$ on $x_t$ which does not affect the identifiability of $z_t$ up to permutation and component-wise invertible transformation. Therefore, NPSSM in (9) is identifiable.

As shown in FIG. 3, in some embodiments, step 304 includes a process 305, where the NPSSM provided includes time-varying change factors for capturing time-varying characteristics of the process, which is also referred to as Time-Varying Non-Parametric State Space Model (TV-NPSSM). Considering that time series are nonstationary in many real situations, in many embodiments, there is a need to explicitly model the time-varying change factors. TV-NPSSM may be formulated as $$\underbrace{x_t = g1(g2(z_t) + \eta_t)}_{\text{Post nonlinear emission}}, \underbrace{z_{it} = f_i(\{z_{j,t-\tau} \mid z_{j,t-\tau} \in Pa(z_{it})\}, c_t, \epsilon_{it})}_{\text{Nonparametric latent transition}}, \tag{13}$$

$$\underbrace{c_t = f_c(\{c_{t-\tau}\}_{\tau=1}^{L_c}, \varsigma_t)}_{\text{Time-varying change factors}},$$

where $\varsigma_t$, similar to $\epsilon_{it}$ are mutually independent (i.e., spatially and temporally independent) random noises. $f_c(\cdot)$ is the transition function for the time-varying change factors, which is also formulated in a non-parametric way, $c_t$ is a low-dimensional vector to characterize the time-varying information, which is used as an input for the transition model $f_i(\cdot)$. TV-NPSSM includes the conventional state space models in Eq. (1) as a particular case in which the time-varying change factors do not exist. It also includes the time-varying parameter vector autoregressive model as a special case, which allows the coefficients or the variances of noises in the linear auto-regressive model to vary over time following a specified law of motion.

At step 306, estimated latent variables of a latent space for the time series dataset is determined, using a neural network system, based on the non-parametric state space model. At step 308, a prediction result for the time series dataset based on the latent causal representation is provided using the neural network system. Example neural network models providing time series forecasting based on the non-parametric state space model are described in detail with reference to FIGS. 4-6 below.

Figure 6:
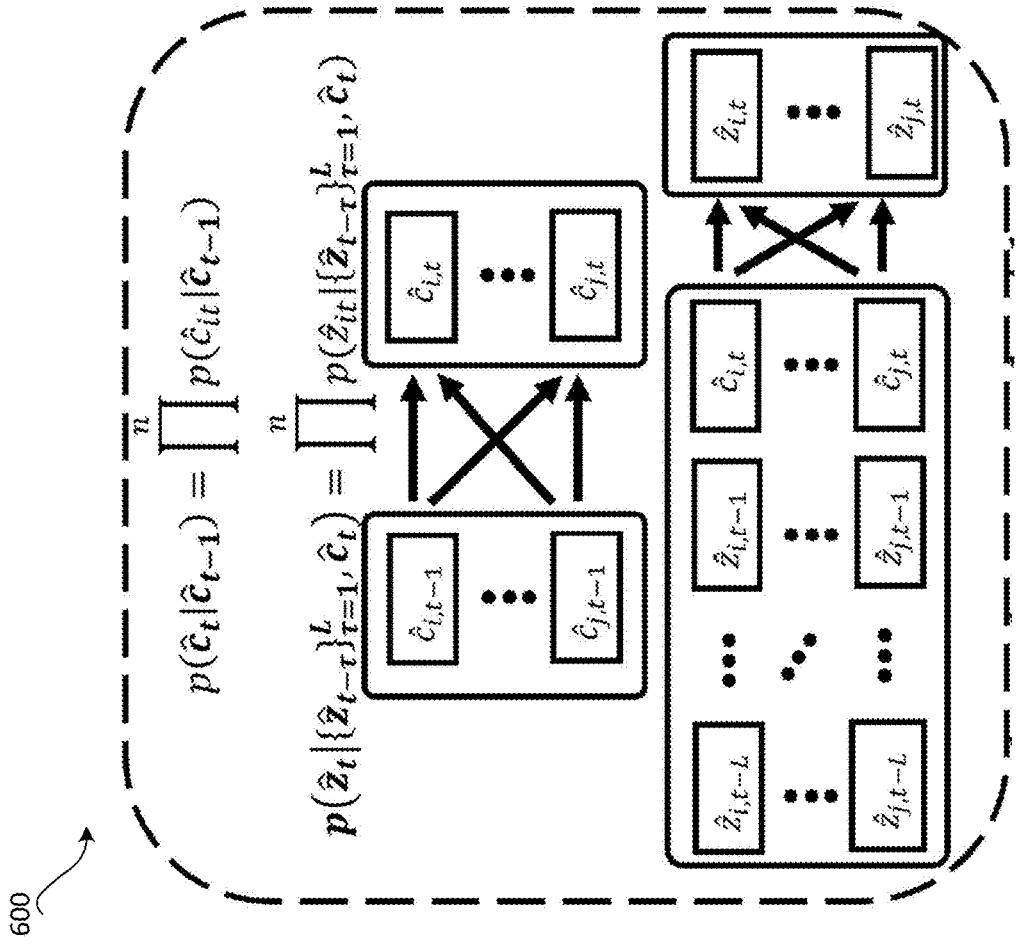
FIG. 6 is an example block diagram illustrating an example transition prior modeling used in the time series forecasting framework of FIG. 5, according to some embodiments described herein.

Referring to FIGS. 4, 5, and 6, example method and system for providing time series forecasting using a neural network based on the non-parametric state space model are described. FIG. 4 illustrates an example method 400 of providing time series forecasting based on the non-parametric state space model. FIG. 5 illustrates an example time series forecasting framework 500 based on the non-parametric state space model that may be used to implement method 400. FIG. 6 illustrates example transition prior modeling used in the time series forecasting framework 500. One or more of the processes described in FIG. 4 may be implemented, at least in part, in the form of executable code stored on non-transitory, tangible, machine-readable media that when run by one or more processors may cause the one or more processors to perform one or more of the processes 402-412. In some embodiments, method 400 may correspond to the method used by the module 130 in FIG. 1.

Referring to FIG. 4, at step 402, a time series dataset is received (e.g., via data interface 215) by a time series forecasting framework. The time series dataset comprises datapoints at a plurality of timestamps in the timeseries. Referring to FIG. 5, an example time series forecasting framework 500 is illustrated. As shown in FIG. 5, time series forecasting framework 500 receives time series dataset 502, e.g., observed time series dataset $x_t$ of a dynamical system. The time series forecasting framework 500 includes the following important components: a variational autoencoder (VAE) framework including encoder 504 and decoder 506 for reconstruction, regularization module 516 (e.g. using transition prior network module 508) for regularization, and an auxiliary predictor 510 for forecasting task. In some embodiments, regularization module 516 of the time series forecasting framework 500 provides regularization 518 between factorized posterior $q(\hat{z}_{1:T})$, $q(\hat{c}_{1:T})$, and prior $p(\hat{z}_{1:T})$, $p(\hat{c}_{1:T})$ for computing the augmented objective loss. Using the time series forecasting framework 500, the prediction procedure disentangles the multivariate forecasting task into the following steps: (1) The encoder captures the nonlinear correlation among series and recovers the latent causal representation from the observed data; (2) Next-step prediction is generated via the auxiliary predictor in the latent space; (3) prediction results are transformed into observed space by the decoder.

VAE. As shown in the example of FIG. 5, time series forecasting framework 500 includes a VAE framework including encoder 504 and decoder 506, where the VAE framework may imply that the measurement noise is additive. This is a particular case of the post nonlinear mixing procedure given in Eq. (2). In an example, to address challenges to model the temporal dependencies among observed and latent variables, especially for the design of the encoder/decoder, a dynamical VAE framework is used to encode the latent sequential information in the encoder explicitly. In some embodiments, to improve efficiency of the estimation, transition prior $p(\hat{z}_{1:T})$ is used to encode sequential information and approximate the joint probability of posterior on $z_{1:T}$ with factorized form. In an example, the encoder for $z_{1:T}$ may be defined as $$\prod_{t=1}^{T} q(\hat{z}_t | x_t),$$

and similarly the encoder for $c_{1:T}$ may be defined as $$\prod_{t=1}^{T} q_c\left(\hat{c}_t | \{\hat{z}_{t-\tau}\}_{\tau=0}^{L_c}\right).$$

Transition Prior Network. In some examples, latent transition may be determined by leveraging the forward prediction function. However, forward prediction cannot model latent processes in a non-parametric way. In the example of time series forecasting framework 500, for implementation based on the non-parametric state space model, transition priors are obtained by learning inverse latent transition functions $f^{-1}$. Particularly, they may be implemented by a set of separate multilayer perceptron (MLP) Networks $r_i$ to satisfy the independent noise condition in Theorem (1), which take the estimated latent causal variables and time-varying change factors as input and output the noise terms, i.e.

$$\hat{\epsilon}_{it} = r_i\left(\hat{z}_{it}, \hat{c}_t, \{\hat{z}_{t-\tau}\}_{\tau=1}^{L}\right).$$

By applying the change of variables formula to the transformation, the transition probability may be formulated in a non-parametric way:

$$p_z\left(\hat{z}_{it} | \{\hat{z}_{t-\tau}\}_{\tau=1}^{L}, \hat{c}_t\right) = p_{\epsilon_i}\left(r_i\left(\hat{z}_{it}, \hat{c}_t, \{\hat{z}_{t-\tau}\}_{\tau=1}^{L}\right)\right) \left| \frac{\partial r_i}{\partial \hat{z}_{it}} \right|. \quad (14)$$

Because of the mutually independent noise assumption, the Jacobian is a lower-triangular. As such, its determinant may be efficiently calculated as the product of each element. By applying the independent noise assumption, the transition probability can be formulated as:

$$\log p_z\left(\hat{z}_t | \{\hat{z}_{t-\tau}\}_{\tau=1}^{L}, \hat{c}_t\right) = \sum_{i=1}^{n} \log p(\hat{\epsilon}_{it}) + \sum_{i=1}^{n} \log \left| \frac{\partial r_i}{\partial \hat{z}_{it}} \right|. \quad (15)$$

To fit the estimated noises terms, each noise $p(\hat{\epsilon}_{it})$ is modeled as a transformation from the standard normal noise $N(0, 1)$ through function $s(\ )$, which may be formulated as $$p(\hat{\epsilon}_{it}) = pN(0, 1)\left(s^{-1}(\hat{\epsilon}_{it})\right) \left| \frac{\partial s^{-1}(\hat{\epsilon}_{it})}{\partial \hat{\epsilon}_{it}} \right|.$$

Specifically, explicitly estimation of the term $$\left| \frac{\partial s^{-1}(\hat{\epsilon}_{it})}{\partial \hat{\epsilon}_{it}} \right|$$

may not be necessary, since inverse causal transition functions $\{r_i\}$ could compensate it. Similarly, the transition probability of change factors $c_t$ may be defined as log $$p_c(\hat{c}_t | \hat{c}_{t-1}) = \sum_{i=1}^{n} \log p(\hat{\zeta}_{it}) + \sum_{i=1}^{n} \log \left| \frac{\partial u_i}{\partial \hat{c}_{it}} \right|$$

where $u_i$ denotes the inverse change transition function.

Auxiliary Predictor. Compared with the conventional forecasting models $p(x_t | \{x_{t-\tau}\})$, which computes prediction loss in input space, in the time series forecasting framework described herein, the latent variables $$\{\hat{z}_t\}_{\tau=1}^{L}$$

are recovered, and the auxiliary predictor is trained in the latent space $$p\left(\hat{z}_t | \{\hat{z}_{t-\tau}\}_{\tau=1}^{L}\right).$$

Note that although we do not explicitly involve the change factor $c_t$ in the predictor, it had to be inferred from the latent variables $$\{\hat{z}_{t-\tau}\}_{\tau=0}^{L}$$

as well, like the definition of encoder $$q_c\left(\hat{c}_t | \{\hat{z}_{t-\tau}\}_{\tau=0}^{L}\right).$$

In an example, the auxiliary predictor 510 uses the long short-term memory (LSTM) network to implement the auxiliary predictor $$p_{pred}\left(\hat{z}_t | \hat{\epsilon}_t, \{\hat{z}_{t-\tau}\}_{\tau=1}^{L}\right)$$

in latent space. The noise $\hat{\epsilon}_t$ is generated from the inverse latent transition function $$r_i\left(\hat{z}_{it}, \hat{c}_t, \{\hat{z}_{t-\tau}\}_{\tau=1}^{L}\right)$$

in the training phase, while it may be sampled from standard normal distribution $N(0, 1)$ in the forecasting phase.

Referring back to FIG. 4, at step 404 of method 400, a training process is performed on the time series forecasting framework using the received time series dataset. During the training process 404, at step 406, one or more estimated latent variables of a latent space are generated. As shown in the example of FIG. 5, the time series forecasting framework 500 provides time series dataset 502 to encoder 504, which generates one or more estimated latent variables $\hat{z}_t$ of the latent space associated with the time series dataset 502. In some embodiments, the time series forecasting framework 500 uses a transition prior network 508 to obtain transition priors, e.g., with time-varying change factors. Referring to FIG. 6, illustrated therein is example transition prior modeling 600 of FIG. 6 representing the latent causal processes $\hat{z}_t$, $\hat{c}_t$. To achieve non-parametric transition probability, the noise distributions $p(\hat{\epsilon})$ and $p(\hat{\varsigma})$ are modeled separately with inverse transition functions $\{r_i\}$ and $\{u_i\}$ respectively.

In some embodiments, during the training process 404, at step 408, an estimated noise is generated based on the one or more estimated latent variables and an estimated time-varying change factor. As shown in the example of FIG. 5, the time series forecasting framework 500 includes an auxiliary predictor 510, which may generate noise $\hat{\epsilon}_t$ from the inverse latent transition function $$r_i\big(\hat{z}_{it},\ \hat{c}_t,\ \{\hat{z}_{t-\tau}\}_{\tau=1}^L\big).$$

In some embodiments, during the training process 404, at step 410, a prediction result in the latent space is generated. As shown in the example of FIG. 5, auxiliary predictor 510 may generate a prediction 512 in the latent space $$p\big(\hat{z}_t\big|\{\hat{z}_{t-\tau}\}_{\tau=1}^L\big).$$

In an example, the auxiliary predictor 510 uses the long short-term memory (LSTM) network to implement the auxiliary predictor $$p_{pred}\big(\hat{z}_t\big|\hat{\epsilon}_t,\ \{\hat{z}_{t-\tau}\}_{\tau=1}^L\big)$$

based on the estimated latent variables $\hat{z}_t$ and the estimated noise $\hat{\epsilon}_t$.

In some embodiments, during the training process 404, at step 412, a prediction result in the observed space is generated using a decoder. As shown in the example of FIG. 5, decoder 506 transforms prediction 512 in the latent space to generate a prediction 514 (also referred to as a reconstructed prediction 514) in the observed space (as the received time series dataset).

In some embodiments, during the training process 404, at step 414, parameters of the neural network models of the time series forecasting framework, including parameters of VAE, transition prior network, and auxiliary predictor, are updated, e.g., using an evidence lower bound objective (ELBO) as follows:

$$\mathcal{L}_{ELBO} = \sum_{t=1}^{T}\log p_z(x_t \mid z_t) + \frac{\sigma}{T}\sum_{t=1}^{T}\log p_{pred}\big(\hat{z}_t \mid \hat{\epsilon}_t, \{\hat{z}_{t-\tau}\}_{\tau=1}^L\big) - \tag{16}$$
$$\beta D_{KL}\big(q_z(\hat{z}_{1:T} \mid \hat{x}_{1:T}) \,\big|\, p(\hat{z}_{1:T})\big) - \gamma D_{KL}\big(q_c(\hat{c}_{1:T} \mid \hat{z}_{1:T}) \,\big|\, p(\hat{c}_{1:T})\big),$$

where $$P_z(x_t|z_t) \text{ and } p_{pred}\big(\hat{z}_t\big|\hat{\epsilon}_t, \{\hat{z}_{t-\tau}\}_{\tau=1}^L\big)$$

denote the decoder distribution and prediction distribution respectively, in which mean squared error (MSE) loss is used for the likelihood. In some embodiments, the training is performed in two phases, wherein during the first phase, the VAE parameters and transition prior network parameters are learned, but not the parameters of the auxiliary predictor. During the second phase after the first phase is performed, all parameters are learned jointly.

Figures 7A, 7B:
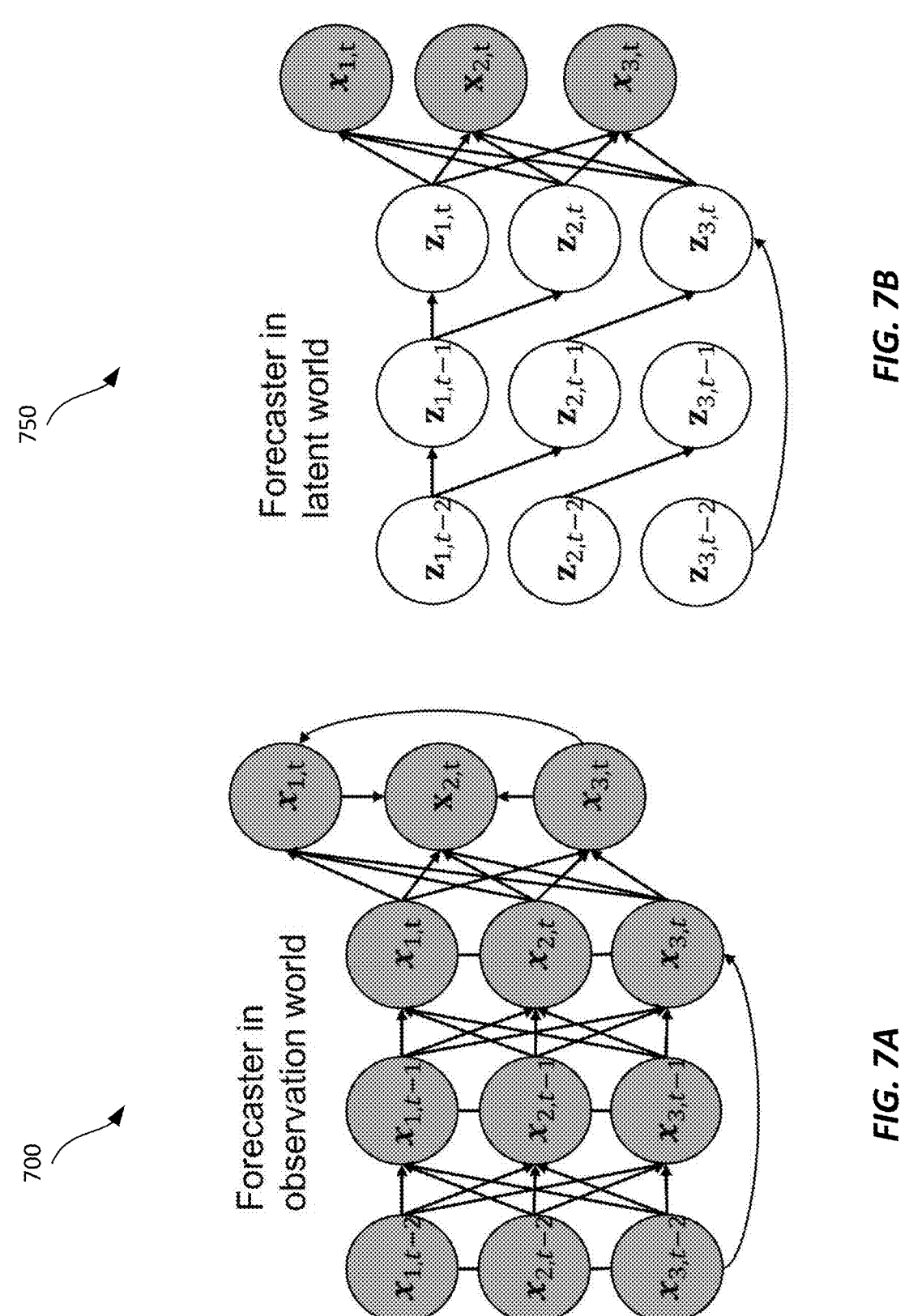
FIGS. 7A and 7B illustrate comparison between example modeling dependencies in observation space and latent space used in the time series forecasting framework, according to some embodiments described herein
Figure 8:
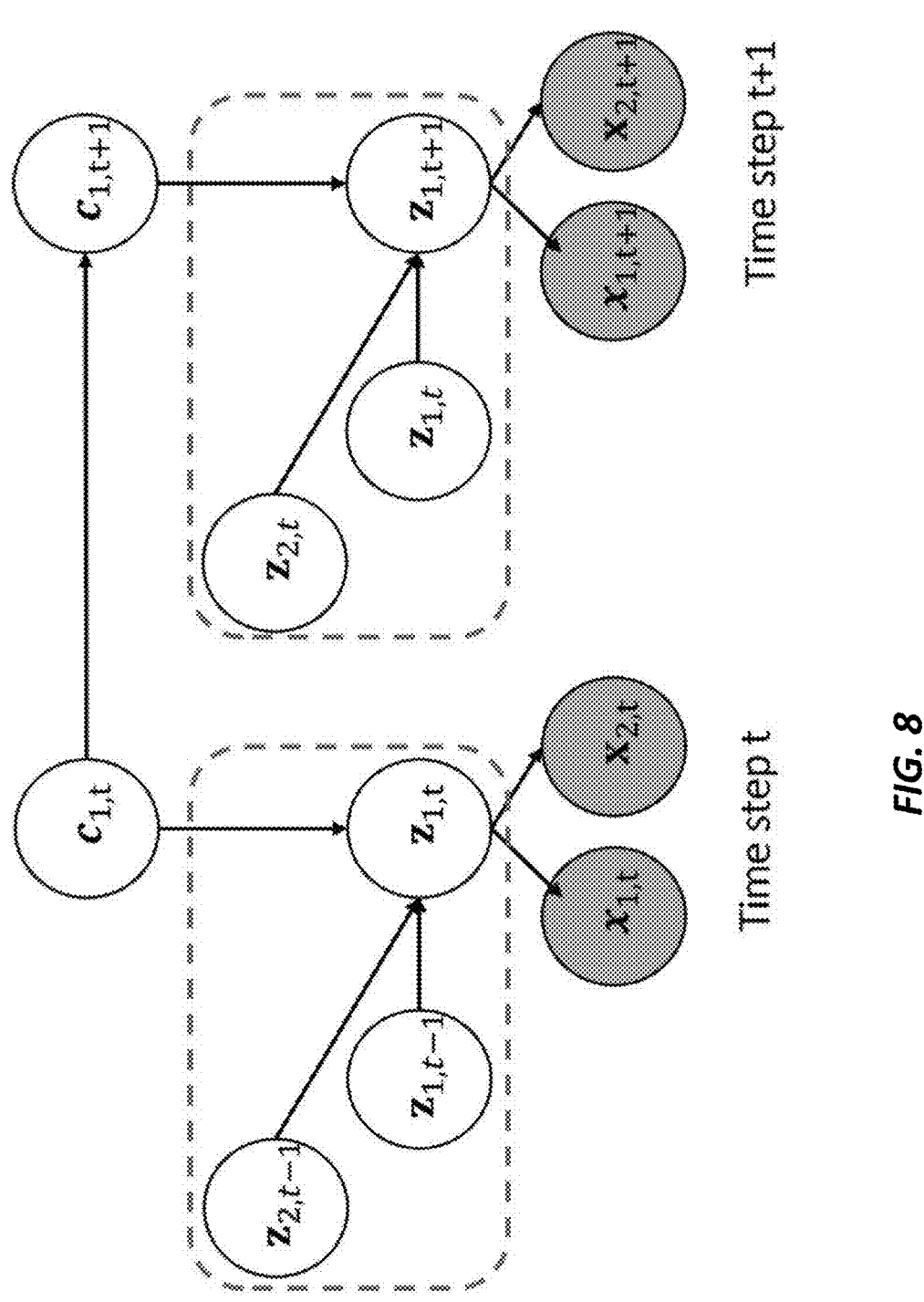
FIG. 8 illustrates a graph representation of a generation process of a dynamical system with time-varying change factors as used in the time series forecasting framework, according to some embodiments described herein.

Referring to FIGS. 7A, 7B, and 8, benefits of time series forecasting via learning underlying causal processes as provided by the time series forecasting framework 500 are described. Specifically, time series forecasting tasks may benefit from causal representation learning, because estimated latent variables are generally identifiable in NPSSM. Given that observed data $x_t$, following the generation process in Eq. (1), the goal of forecasting is to optimize model parameters $\theta$ such that it could maximize the conditional likelihood given the past, $P(x_t|x_{1:t-1})$ In contrast, the objective of estimation of NPSSM is to identify the model first, which aims to recover the latent processes $z_t$ and model parameters to maximize the data likelihood, or conditional likelihood in the time series case. Therefore, using NPSSM, the learned representation achieves the higher conditional likelihood, leading to better forecasting.

Further, learning the latent temporal processes (which are not instantaneously related), as performed by time series forecasting framework 500 based on NPSSM, improves prediction. First, it provides a compact representation for forecasting. As shown in FIG. 7B, true dependencies in observation and latent spaces are compact, compared with uncovered dependencies only from observation space as shown in FIG. 7A, which are complicated with many spurious dependencies. Further, in FIG. 7A, there may be instantaneous relations on $x_t$ but not on $z_t$, which further increases the difficulty for prediction, because instantaneous relations can not be captured if the prediction results of each series are generated separately. Second, learning the latent temporal processes gives a compact way to model the change factors. In realistic situations, data distribution may change over time. In many examples, given the high-dimensional input, the change may happen in a relatively small space, which is known as the minimal and independent change principle in a causal system. By detecting these change factors, these change factors may be encoded with a low-dimensional vector instead of modeling the distribution shift in the high-dimensional input space. As illustrated in FIG. 8, which is a graph representation of generation process of the dynamical system with time-varying change factors, by using time series forecasting framework 500 based on NPSSM, time-varying change factors and fixed latent factors are disentangled from observed data. Third, the prediction given by the causal model is expected to be more robust to the distribution shift that happens to some of the modules in the system. For example, if some local intervention exists on one mechanism, it may not affect other modules, and those other modules may still contribute generously to the final prediction. These benefits are further illustrated with the example data experiments and performance discussed in detail below.

EXAMPLE DATA EXPERIMENTS AND PERFORMANCE

The systems and methods described herein are evaluated on various synthetic and real-world datasets with next-step forecasting tasks. Experimental results demonstrate that latent causal dynamics could be reliably identified from observed data under various settings, and further verify that identifying and using the latent temporal causal processes consistently improve prediction.

Referring to FIG. 9, network architecture for both the training process and the interference process is summarized. Specifically, the models were implemented by PyTorch 1.9.0. The VAE network is trained using AdamW optimizer for a maximum of 100 epochs and early stops if ELBO loss does not decrease for five epochs. A learning rate of 0.002 and a mini-batch size of 64 are used. Three random seeds are used in each experiment, and the mean performance with standard deviation averaged across random seeds are reported.

In some embodiments, the hyperparameters of TV-NPSSM include $[\beta, \gamma, \sigma]$, which represent the weights for transition prior for latent variable z, change factor c, and auxiliary predictor. Since the objective of transition prior does not consider the initial time-lagged variables, conventional VAE is used, where the standard normal distribution $N(0, 1)$ as the prior distribution for these initial latent variable instead. Therefore, we augment the hyperparameters to $[\beta, \beta_{init}, \gamma, \gamma_{init}, \sigma]$ The ELBO loss is used to select the best tuple of $[\beta, \beta_{init}, \gamma, \gamma_{init}, \sigma]$, because low ELBO always lead to high mean correlation coefficient (MCC). For the various datasets discussed below, the optimal configuration for COVID-19 dataset is [5e-2, 5e-3, 1e-4, 1e-3, 1e-1], the optimal configuration for Economics dataset is [5e-2, 1e-3, 5e-5, 1e-3, 1]. To facilitate comparison, the training parameters, e.g. optimizer, batch size, as well as the encoder and decoder architecture are identical to TV-NPSSM. Similarly, hyperparameters are chosen via objective loss. For all experiments, $z \in R^8$ and $c \in R^4$ are used, and the maximum time lag L=2 is set by the rule of thumb. For the initialization of VAE, the instruction of $\beta$-VAE is used and the He initialization is used. For the rest of modules/networks, the uniform initialization is used.

Training Stability. Various techniques are used improve training stability: (1) AdamW optimizer is used as a regularizer to prevent training from being interrupted by overflow or underflow of variance terms of VAE; (2) For the synthetic datasets, in the first phase, the VAE parameters and transition prior network parameters are learned, but not the parameters of the auxiliary predictor. After this phase, all parameters are learned jointly. This allows the model to first find good VAE embedding, and then learn how to utilize it for the forecasting task. For the real-world datasets, a single phase of training is performed, where all the model parameters are learned jointly. Nvidia A100 GPU is used to run the experiments.

Synthetic Datasets. To evaluate the identifiability and forecasting capability of the model under different conditions, various synthetic datasets are generated with 1) fixed causal dynamics; 2) fixed causal dynamics with distribution shift; 3) time-varying causal dynamics with changing noise variances and 4) time-varying causal dynamics with changing causal strengths. The first 80% data is used for training and the rest 20% is used for evaluation.

Fixed Casual Dynamics. For the fixed casual dynamics, 100,000 data points are generated based on the following equation:

$$z_{k,t} = q_k(\{z_{t-\tau}\}) + \frac{1}{b_k(\{z_{t-\tau}\})} \epsilon_{k,t}. \tag{17}$$

Here, $\epsilon_{k,t}$ is standard Gaussian and $\epsilon_{1,t}, \epsilon_{2,t}, \ldots, \epsilon_{n,t}$ are mutually independent and independent from $$z_{t-1} \cdot \frac{1}{b_k},$$

which depends on $z_{t-1}$, is the standard deviation of the noise in $z_{k,t}$. Set the latent size n=8 and the lag number of the process L=2. A 2-layer MLP with LeakyReLU is used as the state transition function. The emission function is a random three-layer MLP with LeakyReLU units. The process noise is sampled from i.i.d. Gaussian distribution ($\sigma$=0.1). The process noise terms are coupled with the history information through multiplication with the average value of all the time-lagged latent variables.

Fixed causal dynamics with distribution shift. Similar to the setting of fix causal dynamics, 80,000 data point are generated for the training set. To add changes, the values of the first layer of the MLP in the test set are varied to generate 20,000 samples. The entries of the kernel matrix of the first layer are uniformly distributed between $[-1, 1]$.

Time-varying causal dynamics with changing noise variances. For the time-varying causal dynamics with changing noise variances, 100,000 data points are generated based on the following equation:

$$c_{k,t} = c_{k,t} + \zeta_{k,t} \tag{18}$$

$$z_{k,t} = q_k(\{z_{t-\tau}\}) + \frac{1}{b_k(\{z_{t-\tau}\}, c_t)} \epsilon_{k,t},$$

where the noises $\zeta_{k,t}$ are sampled from i.i.d. Lapalace distribution ($\sigma$=1). In the latent transition process for $z_t$, noise terms are coupled with the history information and change factors through multiplication with the average value of all the time-lagged latent variables $z_{t-\tau}$ and current time varying change factor $c_t$.

Time-varying causal dynamics with changing causal strengths. For the time-varying causal dynamics with changing causal strengths, the process for changing noise variances is used, and 100,000 data points are generated based on the following equation:

$$c_{k,t} = c_{k,t} + \zeta_{k,t} \tag{19}$$

$$z_{k,t} = q_k(\{z_{t-\tau}\}, c_t) + \frac{1}{b_k(\{z_{t-\tau}\})} \epsilon_{k,t},$$

where we take the change factor $c_t$ as a input for the latent transition function for $z_t$.

Real-World Datasets. Two real-world datasets, including COVID-19 dataset and Economics dataset are used to evaluate the forecasting performance of the systems and methods described herein. The first 80% data is used for training and the rest 20% is used for evaluation.

The COVID-19 incidence data is publicly available at JHU-CSSE (https://github.com/CSSEGISandData/COVID-19) and COVID-19 tracking project (https://covidtracking-.com). The COVID-19 dataset used in the experiments covers the report from 2020, Jan. 23 to 2022, Jan. 1 from 50 states and DC in the US. Consider the skew distribution of new cases, preprocessing step is performed, and the data are normalized with log-transformation log (x+1).

The economics dataset was downloaded from https://www.theglobaleconomy.com. The time-lagged causal relationships about 10 macro-economic variables ranging from CPI, inflation to unemployment rate with monthly data from 1965 to 2017 in the USA, are investigated. Preprocessing step is performed and the data are normalized by subtracting the mean and dividing them by the standard deviation.

Evaluation Metric. To evaluate the identifiability of the learned latent variables, Mean Correlation Coefficient (MCC) is reported, which is a standard metric in ICA literature for continuous variables. MCC is a standard metric for evaluating the recovery of latent factors in ICA literature. It first computes the absolute values of the Spearman's rank correlation coefficients between every ground-truth factor against every estimated latent factor. The possible permutation is adjusted by solving a linear sum assignment problem in polynomial time on the computed correlation matrix. MCC reaches 1 when latent variables are identifiable up to component wise invertible transformation and permutation. To evaluate the forecasting performance, Mean Absolute Error (MAE) and $\rho$-risk which quantifies the accuracy of a quantile $\rho$ of the predictive distribution are reported. Formally, they are defined as:

$$MAE \sum_{i,t} |x_{it} - \hat{x}_{it}| R_p - \text{loss} = \sum_{i,t} (\hat{x}_{it}^p - x_{it})(pI_{\hat{x}_{it}^p > x_{it}} - (1-p)I_{\hat{x}_{it}^p \leq x_{it}}), \quad (20)$$

where $$\hat{x}_{it}^p$$

is the empirical p-quantile of the prediction distribution and I is the indicator function. For the probabilistic forecasting models, forecast distribution are estimated by 50 trials of sampling. We use the predicted median value as $\hat{x}_{it}$.

Baselines. The proposed method is compared with typical deep forecasting models and deep state space models: (1) LSTM which is a baseline for the deterministic deep forecasting model; (2) DeepAR which is an encoder-based probabilistic deep forecasting model; (3) VRNN and (4) KVAE which are deep state space models. Note that KVAE implicitly considers time-varying change factors by formulating the transition matrix as a weighted average of a set of base matrices and using an RNN to predict the combination weights at each step. Finally, (5) TV-NPSSM and NPSSM are compared to verify the effectiveness of incorporating time-varying change factors.

Experimental Results. Synthetic datasets that satisfy the identifiability conditions in the theorems are generated as discussed above. Specifically, four representative settings are considered respectively to validate the identifiability and forecasting results under fixed causal dynamics (Synthetic1), fixed causal dynamics with distribution shift (Synthetic2), time-varying causal dynamics with changing noise variances (Synthetic3) and time-varying causal dynamics with changing causal strengths (Synthetic4). For all the synthetic datasets, set latent size n=8 and the maximum latent process lag is set to L=2. The emission function g(•) is a random three-layer MLP with LeakyReLU units.

Referring to FIG. 10, results therein illustrate that that TV-NPSSM can successfully recover the latent processes under different settings, as indicated by the highest MCC (close to 1). The baselines models (including deep forecasting model and deep state space models) cannot recover the latent processes. Besides, TV-NPSSM gives the best forecasting accuracy, as indicated by the lowest MAE and $R_{0.9}$-loss. In the forecasting task, the best baseline model DeepAR has the highest MCC among them.

Referring to FIGS. 11, results therein illustrate the comparison between TV-NPSSM with NPSSSM and verifies the effectiveness of incorporating time-varying change factors in TV-NPSSM, and illustrate the importance of modeling time-varying change factors.

Figure 12:
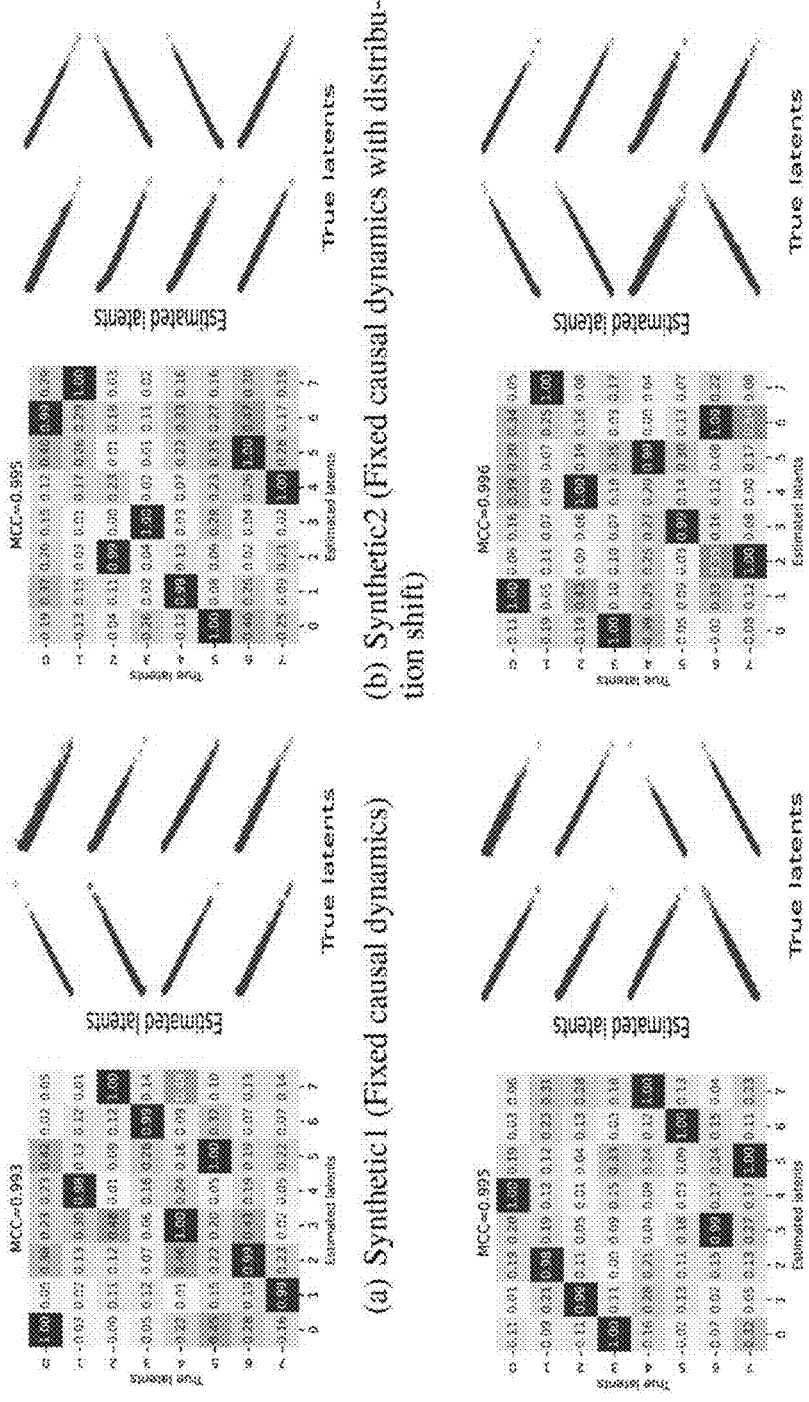

Referring to FIG. 12, each left sub-figure shows the MCC correlation matrix of each factor, while each right sub-figure shows the scatter plot of recovered factor and truth factor. As shown in FIG. 12, the time delayed causal relationships are successfully recovered as indicated by high MCC for the causally-related factors. Besides, the latent causal variables are estimated up to permutation and componentwise invertible transformation.

Figures 13, 14:
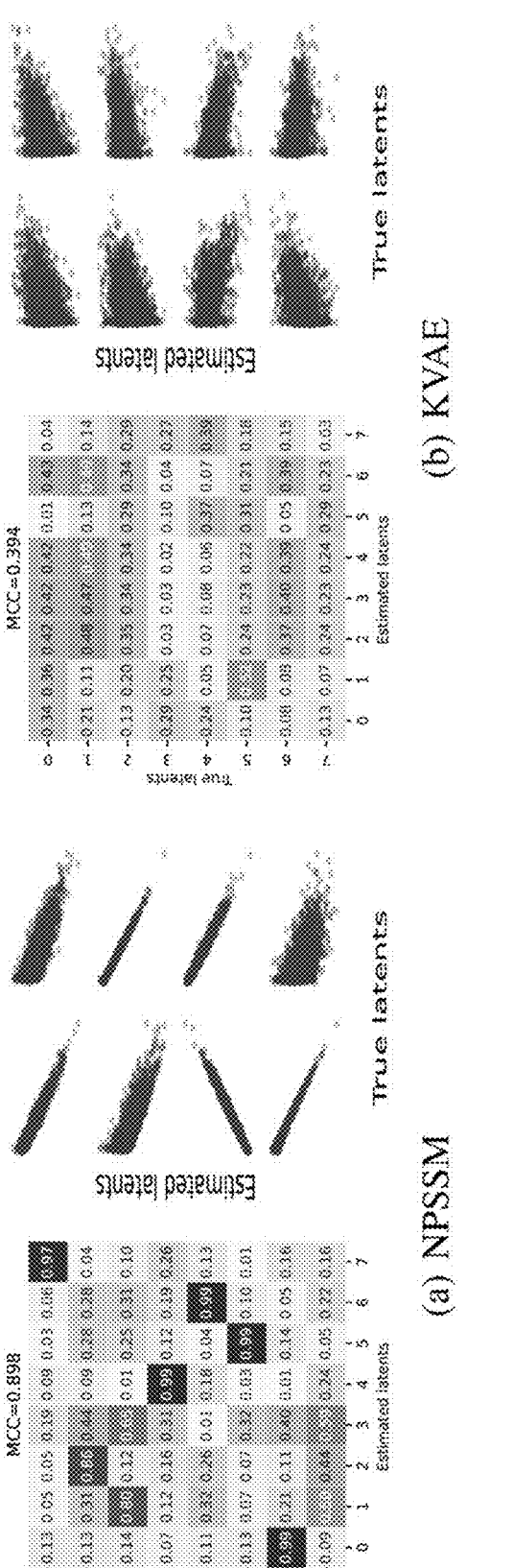

Referring to FIG. 13, illustrated therein are the recovered causal relationships from NPSSM and KVAE in terms of MCC and causal-related factors in Synthetic3 dataset. Compared to KVAE, NPSSM has a better latent causal variables recovery, which are estimated up to permutation and component-wise invertible transformation.

Referring to FIG. 14, the total number of parameters of different methods in our synthetic experiments is summarized. Compared to baselines models, NPSSM and TV-NPSSM requires more extra parameters. This is because these two methods have extra transition prior models. Compared to NPSSM, TV-NPSSM has more parameters since it needs to explicitly model the encoder for $\hat{c}_{1:T}$ conditioned on $$\{\hat{z}_{t-\tau}\}_{\tau=0}^{L_c}.$$

Referring to FIG. 15, TV-NPSSM is evaluated on two real-world datasets: COVID-19 and Economics, and the forecasting performance is compared with baselines. As seen in FIG. 15, TV-NPSSM outperforms all competitors in terms both of MAE and $R_{0.9}$-loss, which verifies the effectiveness of TV-NPSSM and the corresponding time series forecasting framework.

Figure 16:

Referring to FIG. 16, different models are tested using the Economics dataset for qualitative evaluation. As shown in FIG. 16, TV-NPSSM predicts well under various temporal data characteristics.

Figure 17:
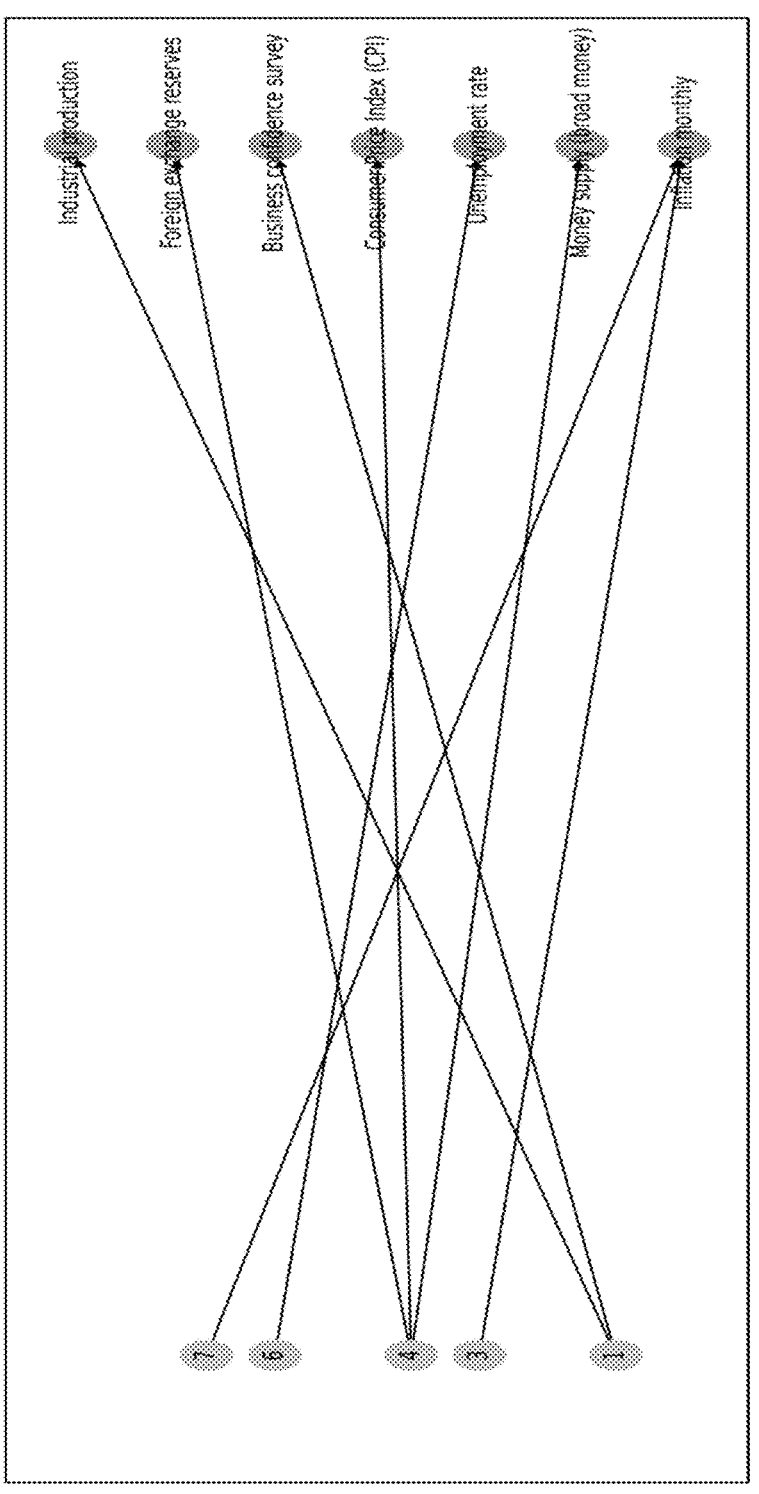

Referring to FIG. 17, illustrated are causal relation between latent variables and observed variables with Economics dataset. The circles to the left with number indicate latent factors, while the circles to the right indicate the observed variables. To visualize nonlinear relations, a post-processing tool (e.g., LassoNet) is used to remove weak edges and generate the sparse causal relation graph from the results on economics dataset. This method prunes input nodes by jointly feeding the first hidden layer and the residual layer through a hierarchical threshold-based optimizer. The LassoNet is first fit on the emission model, which receives latent variables and outputs the observation variables at the same time step. As shown in FIG. 17, industry production and business confidence survey are simultaneously correlated, as both of them are effected by latent factor 1' to the left. Additionally, foreign exchange reserves, Consumer Price Index (CPI) and money supply are simultaneously correlated, as all of them effected by latent factor '4'. Note that latent factors '0', '2' and '5' has been removed by a pruning step when constructing this relation graph. It means these factors do not demonstrate strong causal strengths.

Figure 18:
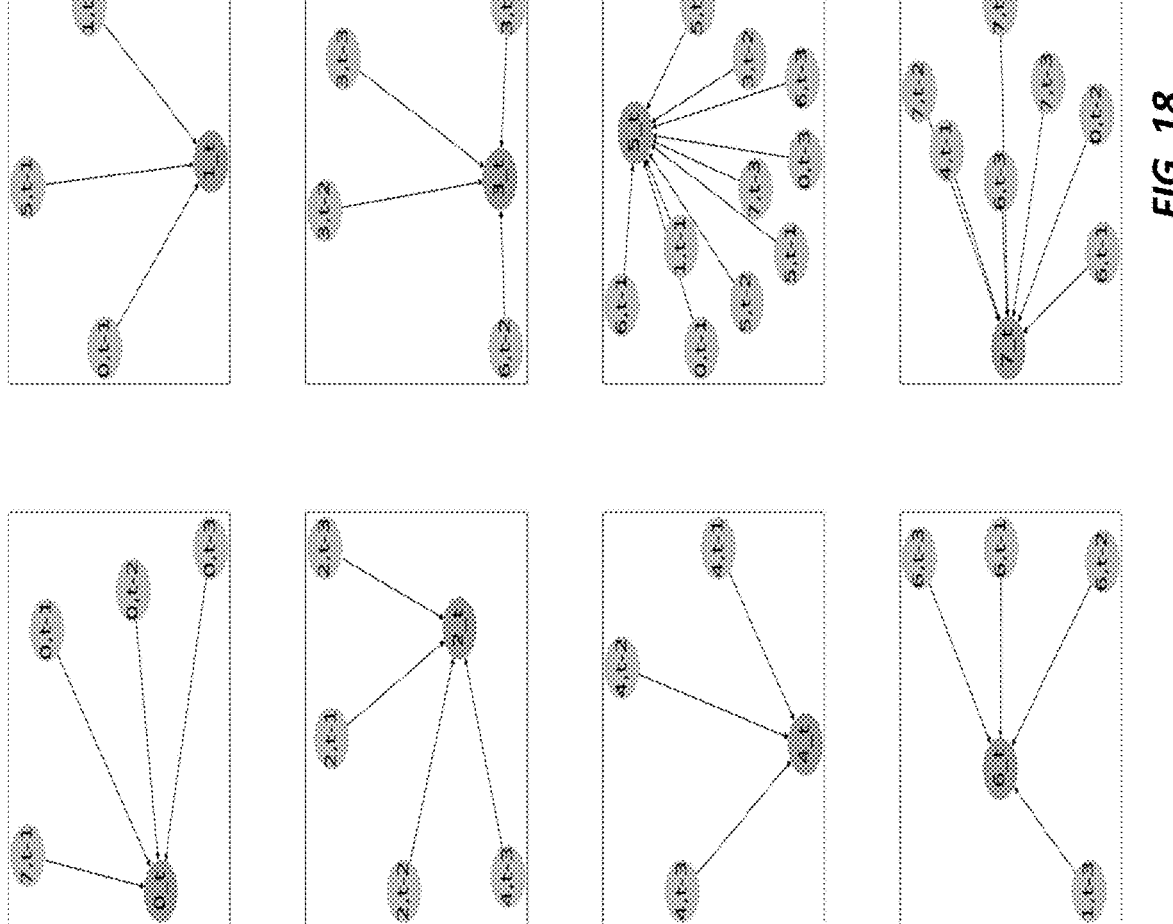

Referring to FIG. 18, time-lagged causal relations graph for latent variables graph based on the results for Economics dataset are illustrated. The circles ending with "_t" indicate the time-lagged source latent factors, and other circles indicate the target latent factors. A post-processing tool, LassoNet, is used to extract the sparse time-lagged causal relation in the latent space. As shown in FIG. 18, most of the latent factors are affected by their time-lagged parents node. Meanwhile, NPSSM can recover the cross relations between latent variables.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of providing a neural network system for time series forecasting, comprising:

receiving, via an input interface, a time series dataset that includes datapoints at a plurality of timestamps in an observed space;

training the neural network system using the time series dataset, wherein the training the neural network system includes:

providing a non-parametric state space model for a dynamic system associated with the time series dataset, wherein the non-parametric state space model includes a nonparametric latent transition model and an emission model, wherein the emission model includes a post-nonlinear transformation associated with distortion in instrument measurements;

generating, using a first encoder of the neural network system based on the non-parametric state space model, one or more estimated latent variables of a latent space for the time series dataset;

generating, using an auxiliary predictor of the neural network system, a first latent-space prediction result based on the one or more estimated latent variables;

transforming, using a first decoder of the neural network system, the first latent-space prediction result to a first observed-space prediction result; and updating parameters of the neural network system using a first objective based on the first latent-space prediction result and the first observed-space prediction result.

2. The method of claim 1, wherein each of the latent variables is identifiable from a corresponding observed data.

3. The method of claim 1, wherein the one or more estimated latent variables are determined based on one or more estimated time-varying change factors.

4. The method of claim 3, wherein the training the neural network system includes:

providing, using the auxiliary predictor, a first estimated noise based on the one or more estimated latent variables and the one or more estimated time-varying change factors; and generating, using the auxiliary predictor, the first latent-space prediction result based on the one or more estimated latent variables and the first estimated noise.

5. The method of claim 1, wherein the neural network system includes a variational autoencoder (VAE) including the first encoder and the first decoder, and wherein the first objective includes an augmented evidence lower bound (ELBO) objective.

6. The method of claim 1, wherein the first objective is based on an auxiliary predictor distribution associated with the first latent-space prediction result.

7. A non-transitory machine-readable medium comprising a plurality of machine-readable instructions which, when executed by one or more processors, are adapted to cause the one or more processors to perform a method comprising:

receiving, via an input interface, a time series dataset that includes datapoints at a plurality of timestamps in an observed space;

training a neural network system using the time series dataset, wherein the training the neural network system includes:

providing a non-parametric state space model for a dynamic system associated with the time series dataset, wherein the non-parametric state space model includes a nonparametric latent transition model and an emission model, wherein the emission model includes a post-nonlinear transformation associated with distortion in instrument measurements;

generating, using a first encoder of the neural network system based on the non-parametric state space model, one or more estimated latent variables of a latent space for the time series dataset;

generating, using an auxiliary predictor of the neural network system, a first latent-space prediction result based on the one or more estimated latent variables;

transforming, using a first decoder of the neural network system, the first latent-space prediction result to a first observed-space prediction result; and updating parameters of the neural network system using a first objective based on the first latent-space prediction result and the first observed-space prediction result.

8. The non-transitory machine-readable medium of claim 7, wherein each of the latent variables is identifiable from a corresponding observed data.

9. The non-transitory machine-readable medium of claim 7, wherein the one or more estimated latent variables are determined based on one or more estimated time-varying change factors.

10. The non-transitory machine-readable medium of claim 9, wherein the training the neural network system includes:

providing, using the auxiliary predictor, a first estimated noise based on the one or more estimated latent variables and the one or more estimated time-varying change factors; and generating, using the auxiliary predictor, the first latent-space prediction result based on the one or more estimated latent variables and the first estimated noise.

11. The non-transitory machine-readable medium of claim 7, wherein the neural network system includes a variational autoencoder (VAE) including the first encoder and the first decoder, and wherein the first objective includes an augmented evidence lower bound (ELBO) objective.

12. The non-transitory machine-readable medium of claim 7, wherein the first objective is based on an auxiliary predictor distribution associated with the first latent-space prediction result.

13. A system, comprising:

a non-transitory memory; and one or more hardware processors coupled to the non-transitory memory and configured to read instructions from the non-transitory memory to cause the system to perform a method comprising:

receiving, via an input interface, a time series dataset that includes datapoints at a plurality of timestamps in an observed space;

training a neural network system using the time series dataset, wherein the training the neural network system includes:

providing a non-parametric state space model for a dynamic system associated with the time series dataset, wherein the non-parametric state space model includes a nonparametric latent transition model and an emission model, wherein the emission model includes a post-nonlinear transformation associated with distortion in instrument measurements;

generating, using a first encoder of the neural network system based on the non-parametric state space model, one or more estimated latent variables of a latent space for the time series dataset;

generating, using an auxiliary predictor of the neural network system, a first latent-space prediction result based on the one or more estimated latent variables;

transforming, using a first decoder of the neural network system, the first latent-space prediction result to a first observed-space prediction result; and updating parameters of the neural network system using a first objective based on the first latent-space prediction result and the first observed-space prediction result.

14. The system of claim 13, wherein each of the latent variables is identifiable from a corresponding observed data.

15. The system of claim 13, wherein the one or more estimated latent variables are determined based on one or more estimated time-varying change factors.

16. The system of claim 15, wherein the training the neural network system includes:

providing, using the auxiliary predictor, a first estimated noise based on the one or more estimated latent variables and the one or more estimated time-varying change factors; and generating, using the auxiliary predictor, the first latent-space prediction result based on the one or more estimated latent variables and the first estimated noise.

17. The system of claim 13, wherein the neural network system includes a variational autoencoder (VAE) including the first encoder and the first decoder, and wherein the first objective includes an augmented evidence lower bound (ELBO) objective.

18. The system of claim 13, wherein the first objective is based on an auxiliary predictor distribution associated with the first latent-space prediction result.

* * * * *